(12) United States Patent
Slemp

(10) Patent No.: US 11,372,096 B2
(45) Date of Patent: Jun. 28, 2022

(54) FREQUENCY MODULATED CONTINUOUS WAVE ANTENNA SYSTEM

(71) Applicant: David Slemp, Ridgecrest, CA (US)

(72) Inventor: David Slemp, Ridgecrest, CA (US)

(*) Notice: Subject to any disclaimer, the term of this patent is extended or adjusted under 35 U.S.C. 154(b) by 182 days.

(21) Appl. No.: 16/991,642

(22) Filed: Aug. 12, 2020

(65) Prior Publication Data

US 2021/0026004 A1    Jan. 28, 2021

Related U.S. Application Data

(63) Continuation-in-part of application No. 16/679,235, filed on Nov. 10, 2019, now Pat. No. 10,754,018, which is a continuation of application No. 15/463,919, filed on Mar. 20, 2017, now Pat. No. 10,473,775.

(51) Int. Cl.
| | |
|---|---|
| *G01S 13/42* | (2006.01) |
| *G01S 13/931* | (2020.01) |
| *G01S 13/34* | (2006.01) |
| *G01S 13/02* | (2006.01) |
| *G01S 13/90* | (2006.01) |

(52) U.S. Cl.
CPC .............. *G01S 13/42* (2013.01); *G01S 13/34* (2013.01); *G01S 13/931* (2013.01); *G01S 13/90* (2013.01); *G01S 2013/0245* (2013.01)

(58) Field of Classification Search
CPC ........ G01S 13/34; G01S 13/42; G01S 13/426; G01S 13/931; G01S 2013/0245
See application file for complete search history.

(56) References Cited

U.S. PATENT DOCUMENTS

| | | | | |
|---|---|---|---|---|
| 5,768,131 | A * | 6/1998 | Lissel ................... | G01S 7/038 180/169 |
| 6,275,180 | B1 * | 8/2001 | Dean .................... | G01S 13/931 342/195 |
| 6,452,536 | B1 * | 9/2002 | Thomassen ............ | G01S 7/023 342/368 |
| 7,019,682 | B1 * | 3/2006 | Louberg ................ | G01S 7/03 342/26 B |
| 7,339,540 | B2 * | 3/2008 | Tietjen ................... | H01Q 21/24 343/882 |

(Continued)

*Primary Examiner* — Peter M Bythrow
(74) *Attorney, Agent, or Firm* — Raymond Sun

(57) ABSTRACT

A method for using a radar assembly to sense an environment includes a radar system that has an antenna assembly secured for 360-degree rotation, the antenna assembly having mounted thereon at least one transmit antenna, and a first set of three or more separate fixed receive antennas, with the antenna assembly having a greater width than height so as to create a fanbeam. In the method of the present invention, the antenna assembly is rotated to a first azimuth position, and then an FMCW waveform is transmitted within the fanbeam, and reflections are received from targets in the environment while in the first azimuth position. Based on the received reflections, data is processed and stored. These steps are repeated for all other azimuths until an azimuth sweep has been completed. At that time, a full environmental data set is compiled for the environment, where the data set comprises azimuth data, range data, elevation data and RCS data. The data set is gathered and delivered to a controller for analysis.

16 Claims, 19 Drawing Sheets

(56) References Cited

U.S. PATENT DOCUMENTS

| | | | | |
|---|---|---|---|---|
| 7,609,198 B2* | 10/2009 | Chang | G01S 13/89 | 342/179 |
| 7,626,536 B1* | 12/2009 | Rihaczek | G01S 13/46 | 342/107 |
| 7,868,817 B2* | 1/2011 | Meyers | G01S 13/4454 | 342/36 |
| 7,889,097 B1* | 2/2011 | Arnold | H01Q 3/26 | 340/933 |
| 8,451,165 B2* | 5/2013 | Puzella | G01S 7/032 | 342/13 |
| 8,477,063 B2* | 7/2013 | Meyers | G01S 13/34 | 342/158 |
| 8,902,099 B2* | 12/2014 | Noon | G01S 7/062 | 342/22 |
| 9,182,476 B2* | 11/2015 | Wintermantel | G01S 13/343 | |
| 9,395,727 B1* | 7/2016 | Smith | G05D 1/0257 | |
| 9,628,170 B1* | 4/2017 | Rosenband | G01S 7/4972 | |
| 9,739,881 B1* | 8/2017 | Pavek | G01S 13/865 | |
| 9,994,152 B1* | 6/2018 | Hess | G01S 13/931 | |
| 2003/0156055 A1* | 8/2003 | Tamatsu | G01S 13/584 | 342/107 |
| 2006/0092075 A1* | 5/2006 | Bruce | G01S 7/02 | 342/149 |
| 2007/0252748 A1* | 11/2007 | Rees | H01Q 13/02 | 342/36 |
| 2008/0136718 A1* | 6/2008 | Tietjen | H01Q 1/1235 | 343/711 |
| 2009/0073023 A1* | 3/2009 | Ammar | G01S 17/89 | 342/22 |
| 2009/0135051 A1* | 5/2009 | Bishop | G01S 13/867 | 342/175 |
| 2010/0085235 A1* | 4/2010 | Meyers | G01S 13/4454 | 342/29 |
| 2011/0187579 A1* | 8/2011 | Asada | G01S 13/30 | 375/295 |
| 2011/0199254 A1* | 8/2011 | Bishop | G01S 13/867 | 342/179 |
| 2012/0235857 A1* | 9/2012 | Kim | G01S 13/931 | 342/134 |
| 2013/0169468 A1* | 7/2013 | Johnson | G01S 7/038 | 342/41 |
| 2015/0268328 A1* | 9/2015 | Johnson | G01S 13/10 | 342/21 |
| 2016/0131752 A1* | 5/2016 | Jansen | G01S 13/42 | 342/27 |

* cited by examiner

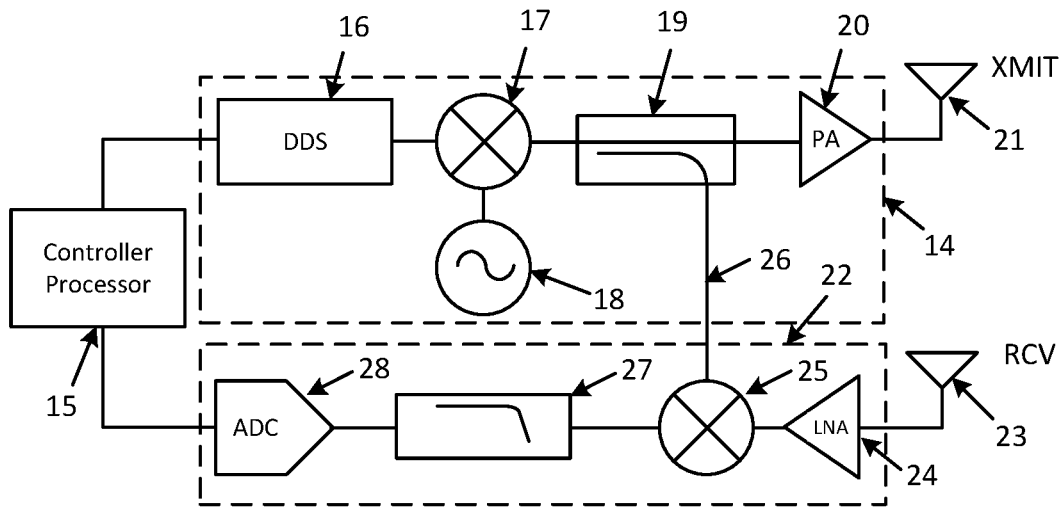
Figure 2
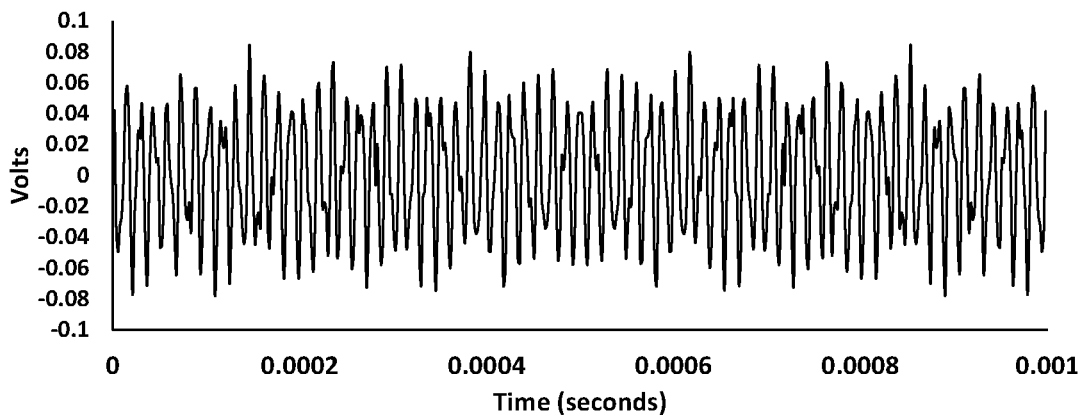
Figure 3
| Ch A | Bin 1 | Bin 2 | Bin 3 | Bin 4 | Bin 5 | Bin 6 | Bin 7 | ... | Bin N |
|---|---|---|---|---|---|---|---|---|---|
| Amplitude | A1 | A2 | A3 | A4 | A5 | A6 | A7 | - | An |
| Time | T1 | T2 | T3 | T4 | T5 | T6 | T7 | - | Tn |
Figure 4

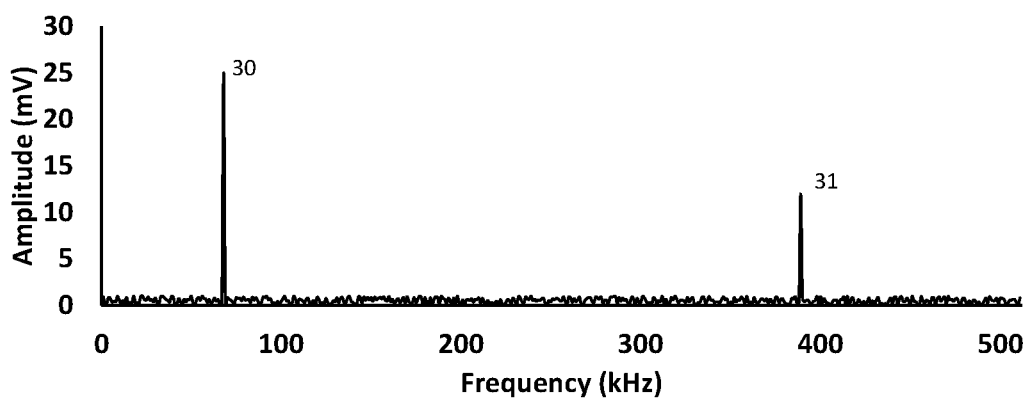
*Figure 5*
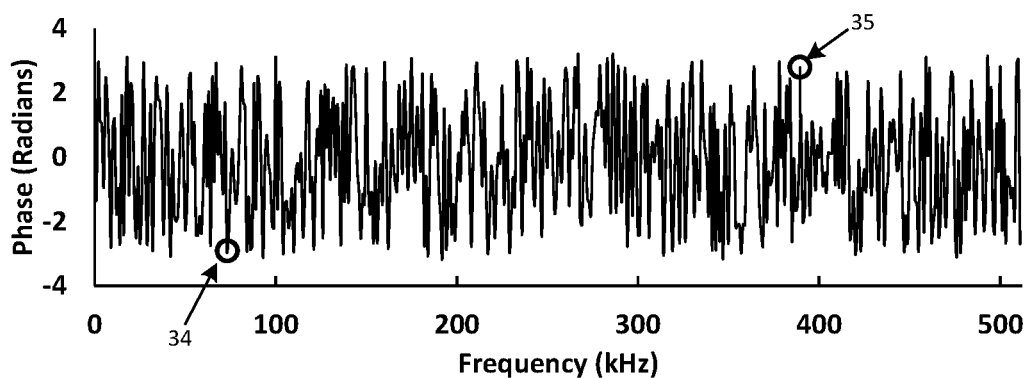
*Figure 6*
| Ch A | Bin 1 | Bin 2 | Bin 3 | Bin 4 | Bin 5 | Bin 6 | Bin 7 | ... | Bin N |
|---|---|---|---|---|---|---|---|---|---|
| Amplitude | A1 | A2 | A3 | A4 | A5 | A6 | A7 | - | An |
| Phase | θ1 | θ2 | θ3 | θ4 | θ5 | θ6 | θ7 | - | θn |
| Frequency | F1 | F2 | F3 | F4 | F5 | F6 | F7 | - | Fn |
*Figure 7*

| Ch A | Bin 1 | Bin 2 | Bin 3 | Bin 4 | Bin 5 | Bin 6 | Bin 7 | ... | Bin N |
|---|---|---|---|---|---|---|---|---|---|
| RCS | R1 | R2 | R3 | R4 | R5 | R6 | R7 | - | Rn |
| Height | H1 | H2 | H3 | H4 | H5 | H6 | H7 | - | Hn |
| Distance | D1 | D2 | D3 | D4 | D5 | D6 | D7 | - | Dn |

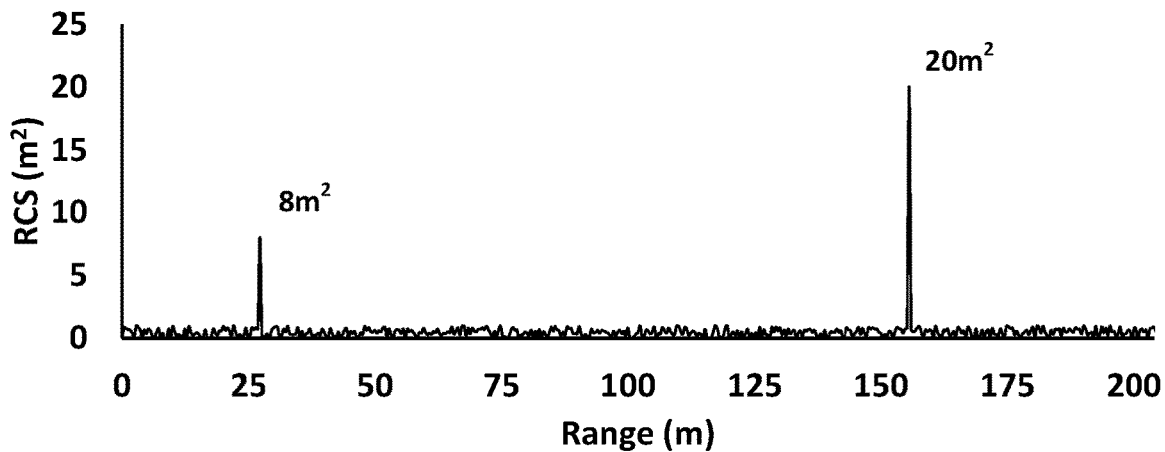
*Figure 21*
| Ch A | Bin 1 | Bin 2 | Bin 3 | Bin 4 | Bin 5 | Bin 6 | Bin 7 | ... | Bin N |
|---|---|---|---|---|---|---|---|---|---|
| RCS | R1 | R2 | R3 | R4 | R5 | R6 | R7 | - | Rn |
| AOA | φ1 | φ2 | φ3 | φ4 | φ5 | φ6 | φ7 | - | φn |
| Distance | D1 | D2 | D3 | D4 | D5 | D6 | D7 | - | Dn |
*Figure 22*
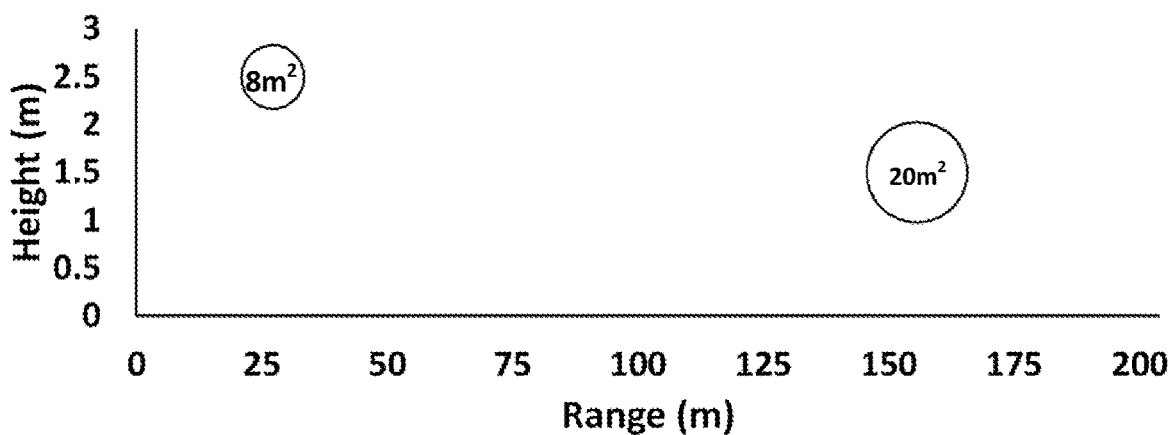
*Figure 23*

FREQUENCY MODULATED CONTINUOUS WAVE ANTENNA SYSTEM

BACKGROUND OF THE INVENTION

1. Field of the Invention

The invention herein relates generally to radar systems and methods including Frequency Modulated Continuous Wave (FMCW) radar techniques and Angle of Arrival interferometry processing techniques for use in three dimensional imaging radar systems in general, and more specifically those used in vehicles as sensors for machine environmental awareness.

2. Description of the Prior Art

A RADAR (RAdio Detection And Ranging) system senses its environment by transmitting electromagnetic energy, and receives the subsequent reflected energy from objects in its local environment. The radar then processes this information into usable data to be delivered to a system controller or operator for use. Radar transmitters can apply many different frequencies and modulation techniques, and various types of usable data can be created, typically including range, azimuth, elevation and relative radial motion, depending on the desired end use of the system.

In recent years, radar use in automobiles has been increasing significantly for improved automation and safety. The automotive industry is investing heavily in improving sensing technology performance as situational awareness for onboard computer systems is considered insufficient. While radar, Lidar, cameras and ultrasonic sensors all have their own strengths, radar is considered an essential sensing technology due to its ability to measure distances and relative speed directly and can see through dust, fog, snow and rain at long distances.

Ideally, an automotive radar will provide 360 degree three-dimensional awareness with fine detail around the vehicle. However this type of imaging radar is, at best, extremely expensive to generate the detailed information required quickly to be useful. To date commercial radar systems have a limited field of view and generally are not able to resolve target detail or specific location within the radar beam. In particular, measuring the height of a target is very difficult without using sophisticated imaging techniques.

The most common type of automotive radar used today is a relatively short range fixed millimeter-wave Frequency Modulated Continuous Wave (FMCW) radar which provides accurate range and relative target size within a predefined transmit beam and within a relatively short radius, but does not generally determine location within the beam or height of targets. To compensate for this limited resolution, automakers often use many radars of varying beam widths, effective range and pointing directions to improve environmental awareness around the vehicle. Yet these remain as relatively coarse measurements that often do not include precise location or elevation information. This lack of resolution is driving the automotive industry to develop radar systems with improved performance.

The Problem

Presently, the most common area of research for automotive radar system development is applying phased array and synthetic aperture radar imaging techniques to fixed multi-element arrays positioned at multiple locations around the vehicle. These designs are based on imaging arrays previously developed by governmental defense and aeronautic organizations to image target areas from remote platforms. These systems do image the target environment in great detail and would be a superb solution for sensing the immediate environment. However, even these advanced radar systems, some with multi-million dollar budgets, record the data for post-processing which is unacceptable for automotive use. Phased array antenna systems steer a beam electrically without having to move the antenna elements. These arrays can scan in both azimuth and elevation simultaneously at the speed of the electrical switching circuits. Additionally, complex information received from an array can be processed using aperture synthesis based algorithms to form a Real Aperture Radar that can image targets in great detail. In both cases, to increase angular resolution of such an array, the radar designer will increase the number of elements in both dimensions, but this will be at the expense of an exponential increase in the computational resources required and/or additional time for processing, and its associated increase in cost. To estimate the number of elements the designer must choose the angular resolution and wavelength of the system.

Hardware Complexity Estimation

By using a form of the Rayleigh Criterion, an estimation of array size is given by:

$$D = 1.22 \frac{\lambda}{\theta} \quad \text{Equation 1}$$

Where:
D=Width of the array (m)
$\lambda$=Wavelength (m)
$\theta$=Desired resolution in radians As an example, an automotive radar designer specifies an angular resolution of 1.0 degree (0.0175 radians) in both azimuth and elevation with a wavelength of 4 mm, the minimum aperture size D will be 1.22 (4 mm/0.0175)=279 mm. Typically an array will have elements spaced no more than every 0.5$\lambda$ so the number of elements in a single dimension will be (279 mm/4 mm)/0.5=140. For a rectangular array with an azimuth and elevation resolution of 1.0×1.0 degrees the number of elements required is therefore 140×140 or 19,600.

It should be noted that in order for the array to function properly, each array element must have its own unique receiver circuitry to down-convert the RF and record the data. In the above example, if all the components associated with each element were to cost $1, the array would cost nearly $20,000. It quickly becomes apparent how the cost of such an array is prohibitive for use in commercial automobiles.

Computation Load Estimation

Real aperture imaging requires processing complex data from baselines formed by element pairs. If a single calculation process is defined as the amount of processing required for a single baseline, or element pair, then the total number of such processes can be estimated by calculating the number of baselines in any given array. The number of unique baselines in any given array is:

$$N_B = \frac{N_E^2 - N_E}{2} \quad \text{Equation 2}$$

Where:

$N_B$=Number of baselines in the array
$N_E$=Number of elements in the array.

Using equation 2, the number of processes can be calculated for a 19,600 element array which will require over 192 million unique processes. Since each sensor will likely create a dataset of 2048 unique 16 bit numbers, or more, to be used for each complex baseline process, one can easily see that a Real Aperture computational load is presently too large to process onboard a consumer vehicle. Additionally, an automotive radar needs rapid updates which may be 5 or more complete environmental updates per second with a processing delay of no more than 0.1 second or less to ensure the data is meaningful when used. Further, if radar coverage of more than +/−60 degrees is required, additional radar arrays will need to be added with their associated costs.

Thus, there are two primary limitations for high resolution automotive radar imaging: (i) insufficient onboard computational capacity and/or the high price of high-speed computational hardware; and (ii) The high cost of advanced phased array elements required to image broad areas of the immediate environment with sufficient detail.

These challenges present the need for low cost alternative automotive radar architectures that can provide high resolution range, azimuth, elevation and signal strength data immediately surrounding the vehicle, and which can process and update this data fast enough for immediate use.

SUMMARY OF THE DISCLOSURE

The present invention provides a method for using a radar assembly to sense an environment. The radar system can include an antenna assembly secured for 360-degree rotation, the antenna assembly having mounted thereon at least one transmit antenna, and a first set of three or more separate fixed receive antennas, with the antenna assembly having a greater width than height so as to create a fanbeam. In the method of the present invention, the antenna assembly is rotated to a first azimuth position, and then an FMCW waveform is transmitted within the fanbeam, and reflections are received from targets in the environment while in the first azimuth position. Based on the received reflections, data is processed and stored. These steps are repeated for all other azimuths until an azimuth sweep has been completed. At that time, a full environmental data set is compiled for the environment, where the data set comprises azimuth data, range data, elevation data and RCS data. The data set is gathered and delivered to a controller for analysis.

BRIEF DESCRIPTION OF THE DRAWINGS

FIG. 2 illustrates a common FMCW radar architecture.

FIG. 3 is a graphical example of an FMCW baseband signal from two targets in an Amplitude vs Time format.

FIG. 4 is an FMCW beat frequency Amplitude vs Time data file construction after analog to digital conversion.

FIG. 5 is the Amplitude vs Frequency data graph of the baseband signal shown in FIG. 3 after FFT processing.

FIG. 6 is the Relative Phase vs Frequency data graph of the baseband signal shown in FIG. 3 after FFT processing.

FIG. 7 is an FMCW beat frequency Amplitude and Phase vs Frequency data file construction after FFT Processing.

FIG. 21 is the RCS vs Range data graph of the signal shown in FIG. 5 after processing FIG. 22 is the RCS and Angle of Arrival vs Distance data file construction derived from the Amplitude and Relative Phase vs Frequency data file after processing.

FIG. 23 is the RCS and Height vs Range graph of the signal shown in FIG. 21 after processing

DETAILED DESCRIPTION OF THE PREFERRED EMBODIMENTS

Figure 1:
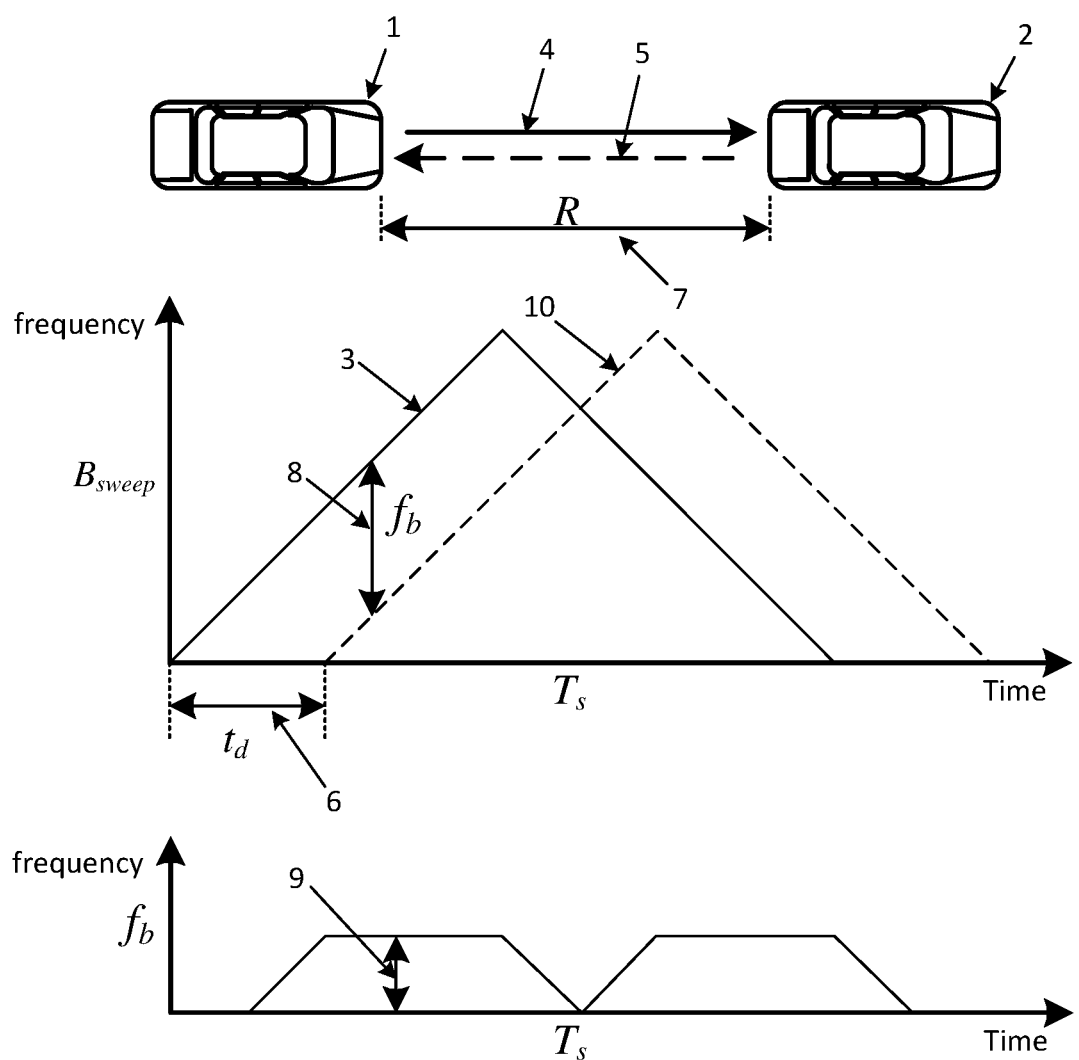
FIG. 1 illustrates a common FMCW automotive usage and principle.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The most direct approach to lowering the cost of a practical 3D automotive radar is to drastically reduce the number of array elements needed to form the 3D image. This would significantly reduce the cost of the expensive array elements and drastically reduce the number of computations required, which would significantly reduce the cost of computation hardware. If successful, these advantages may make it possible to bring the first affordable 3D radar system to market.

In order to reduce the number of array elements, the radar designer must reduce the need for many of the elements. This can be accomplished by introducing mechanical scanning in one of the two X, Y dimensions to remove the requirement of electromagnetic scanning.

Since the introduction of military radars nearly 80 years ago, motor driven rotation has been the most common method of radar azimuthal scanning. By replacing the X scanning elements in an X vs Y array and providing a rotational scan of only the Y elements, an array can have the number of elements reduced by 99% or more. For example, if a 140×140 array has 19,600 elements, removing the X dimension can theoretically reduce the number of elements to 140 for a 99% reduction. However, that would require that the 140 remaining vertical Y elements are only needed to resolve elevation information. This can be done by narrowing the transmit beam to the desired azimuth resolution so no X axis sweep data is received and only Y data needs to be processed. The receive elements will only receive the reflections from the narrow transmitted beam, therefore the system azimuthal resolution will be directly proportional to the combined transmit and receive beam widths. So in order to keep the number of receive elements to a minimum the preferred solution to maintaining narrow azimuthal resolution is to narrow the transmit beam in azimuth as much as practicable. For example, a 77 GHz radar with a 275 mm wide fixed phased array antenna can provide a near 1.0 degree beam width, which is sufficient for a high resolution 3D scanning radar.

In the above example, a 140×140 element array was decimated by 99% when reduced to a 140 element linear array from 19,600 elements. A 19,600 element array will require over 192M processes, yet a 140 element array processed the same way will only require 9,730 equivalent processes for nearly a 20,000:1 reduction in processing. Yet further substantial decimation of the number of elements is possible while maintaining very accurate elevation resolution by substituting a three or four element interferometer for the 140 element vertical array as described in the example above.

This unique radar consists of a combination of FMCW, Three Antenna Interferometry, mechanical scanning, and FFT processing. Below is a basic explanation of these features as used in this invention, as well as the Radar Range equation.

Frequency Modulated Continuous Wave (FMCW) Radar
FMCW is a radar modulation technique that is generally low cost and highly accurate for nearby distance measurements.

FIG. 1 shows a simple FMCW processing cycle from within a host vehicle 1 and a target vehicle 2. A continuous wave signal 3 that is frequency modulated in one or more ways (in this case, linear triangular modulation), is amplified, and transmitted into the local environment to illuminate a target (see 4). Reflected FMCW signals 10 from a target are received (see 5). The reflected signals are delayed by the round-trip time (see 6) of flight that is a function of the distance 7. This delay causes the reflected signal and transmitted signal to have a difference in frequency (see 8) between them, which is constant if the modulation is linear. These two signals are mixed together to derive a baseband signal 9 that contains difference frequencies that represents targets and their relative distances 7.

Relation between delay and sweep times, and beat and sweep frequency:

$$\frac{t_d}{T_s} = \frac{f_b}{B_{sweep}}$$

The FMCW Range Equation:

$$R = \frac{cT_s f_b}{2B_{sweep}}$$

Where:
R=Range
c=speed of light
$T_s$=Sweep Time
$T_d$=Delay Time
$F_b$=Beat Frequency FIG. 2 illustrates a common FMCW radar architecture. Within a transmitter section 14, a system controller or processor 15 commands a modulator 16 to start a frequency sweep at low frequency. This frequency is up-converted to a higher frequency using a mixer 17 and a local oscillator 18. This higher frequency signal is passed through a directional coupler 19 to a power amplifier 20 and then to a transmit antenna 21 to illuminate a target.

The reflected signal is received by the antenna 23 of a receiver 22, where it is amplified with a Low Noise Amplifier (LNA) 24 and then downconverted to baseband by mixing 25 using a sample of the transmit signal from the directional coupler 26.

The mixing 25 can be accomplished through homodyne mixing, heterodyne mixing, or superheterodyne mixing. The high frequency components are filtered out by a filter 27 prior to digitizing by an Analog to Digital Converter (ADC) 28. The digital data is then passed to the controller or processor 15 for post processing and storage for later use.

Fast Fourier Transform (FFT)
The output data set of an FMCW receiver is a simple amplitude vs time waveform (FIG. 3) which consists of Amplitude and Time data pairs (FIG. 4). To make the FMCW data useful, it needs to be transformed into its spectral content which then is converted to amplitude vs. range. A Fast Fourier Transform can be any one of a number of algorithms that efficiently calculate the Discrete Fourier Transform (DFT) of a sequence. In the present context, the FFT converts a single time domain data series into a complex frequency domain series, and is defined by the formula: Let $X_0, \ldots, X_{N-1}$ be complex numbers $$X_k = \sum_{n=0}^{N-1} x_n e^{-\frac{i2\pi kn}{N}} \quad k = 0, \ldots, N-1$$

(FFT Equation)

Each of the transformed series will have complex outputs in the form of real and imaginary amplitudes vs frequency, or preferably amplitude and relative phase vs frequency. FIG. 5 shows an FFT processed Amplitude vs Frequency dataset. Target 1 (30) and Target 2 (31) will each have unique amplitude vs frequency data. The FFT will also calculate relative phase vs frequency data as shown in FIG. 6. Target 1 phase (34) and Target 2 phase (35) is shown. This data file set consists of data triplets of Amplitude, Phase, and Frequency (FIG. 7). A target's amplitude vs frequency will be used to calculate its radar cross section (RCS) and range using the Radar RCS Equation and the FMCW range equation. The relative phase vs frequency data will be used to calculate a target's elevation angle using the Three Antenna Interferometer equations.

Radar Cross Section (RCS) Equation

Each range point has an associated amplitude that represents the strength of a target reflection at that range. These amplitudes may be directly converted to Radar Cross Section (RCS) based on the standard radar equation.

Standard Radar Equation $$P_r = \frac{P_t G_t A_r \sigma F^4}{(4\pi)^2 R_t^2 R_r^2}$$

Derive RCS Equation from Standard Radar Equation $$\sigma = \frac{P_r (4\pi)^2 R_t^2 R_r^2}{P_t G_t A_r F^4}$$

Where:
σ=RadarCross Section (m²)
P$^r$=Power Received (W)
P$_t$=Power Transmitted (W)
R$_t$=Range to Transmit Antenna (m)
R$_r$=Range to Receive Antenna (m)
G$_t$=Gain of Transmit Antenna (unitless)
F=Propagation Factor (unitless)
A$_r$=Effective Area of Receive Antenna (m²)

Three Antenna Interferometer

Typically, automotive radars use common FMCW modulation/demodulation techniques to resolve target reflection amplitude and target range within the beam. The single antenna receives the reflected signals from all targets in the beam and mixes them with the transmit signal for direct downconversion to the intermediate or baseband frequency. By transforming this complex time domain information into its spectral components using Fast Fourier Transform algorithms, the signal data is reduced to amplitude vs frequency and relative phase vs frequency data. FMCW intermediate frequency (IF) data translates directly to range data. A higher IF directly translates to a longer target distance and is very accurate. The phase vs frequency data of a single receive channel contains no usable information so it is discarded. However, this phase data is useful if three or more channels of data are available.

Figure 8A:
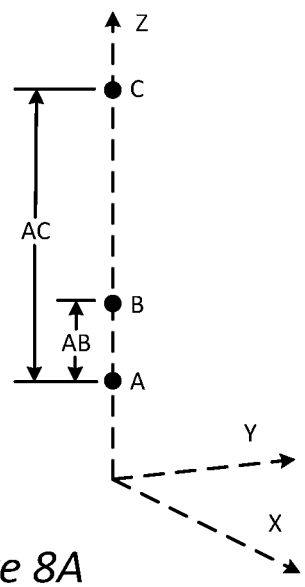
FIG. 8A illustrates a three antenna Angle of Arrival interferometer.
Figure 8B:
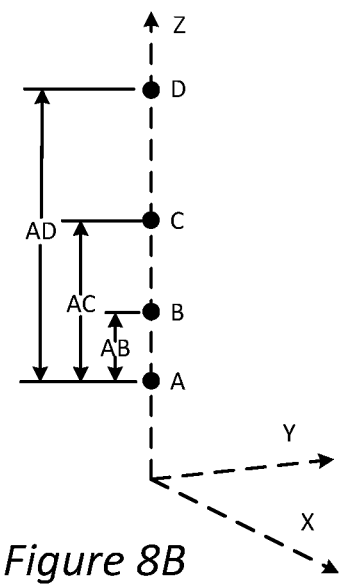
FIG. 8B illustrates a four antenna Angle of Arrival interferometer.

If two channels receive reflections from the same source, an element pair or baseline is formed (FIG. 8A Baseline 'AC'). By using very simple Angle of Arrival (AOA) interferometry calculations, the angle towards the signal source relative to the baseline can be calculated. However, because of 'Phase Wrapping', a number of valid angles may be calculated that makes the results ambiguous. If a second baseline (FIG. 8A Baseline 'AB') with a different separation distance between elements records the same reflections, and the two baselines are collinear, it will also calculate a set of valid ambiguous angles. However, when comparing one set of baseline angles with the set from the other baseline, only one angle will be the same which is the actual AOA. Increased accuracy occurs with increased baseline lengths, but this increases the number of ambiguous angles for each baseline as well. Therefore, additional baselines are often used to decrease AOA ambiguity when using longer baselines. FIG. 8A illustrates a 3 antenna interferometer and FIG. 8B illustrates a 4 antenna interferometer.

To create two separate baselines, a minimum of three sensor channels are required. If we have sensors A, B and C, we can create three baselines, AB, AC, and BC which can be used to determine the unambiguous angle of arrival. If using standard FMCW equipment and techniques, very little additional processing is required per baseline since the data are already available from the standard FMCW FFT calculations. This reduces the number of receive sensors to three, yet we can still achieve a 1.0×1.0 degree resolution or better. Using the previous examples, we have reduced our computation load from 192M baseline processes down to two, and these are simplified further by using data already created from the FMCW calculations.

Figure 9:
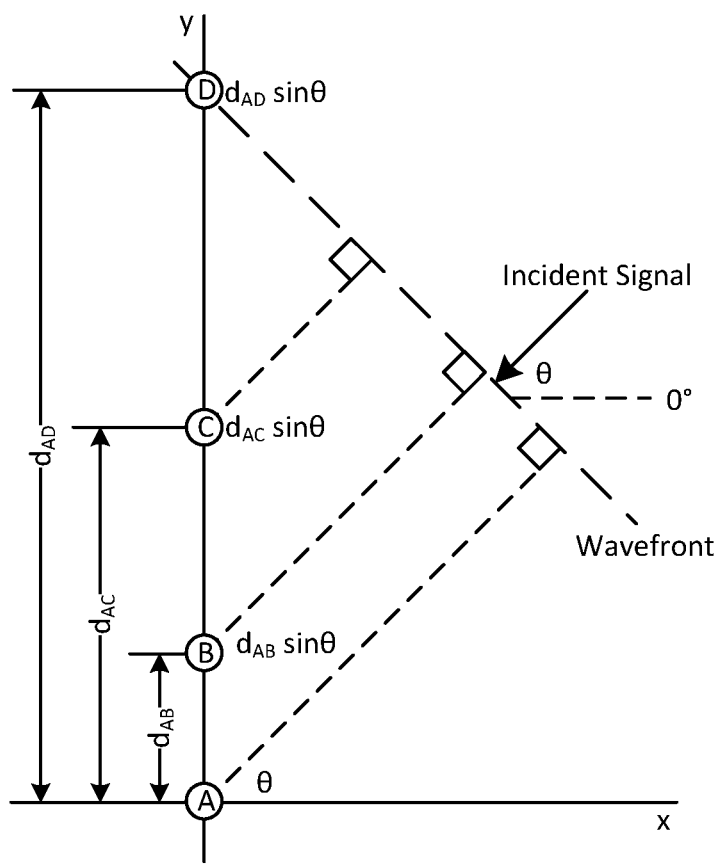
FIG. 9 illustrates a four antenna interferometer sampling an off-axis incident signal with three baselines.

However, it is often common to reduce ambiguity related errors and uncertainty further by adding a fourth antenna to create a 3 baseline interferometer. See FIG. 9.

The relative phase vs range data from each of the three or four receive data sets can be used to determine the elevation angle of arrival of target reflections within the transmit beam. With a minimum of three collinear sensors, unevenly spaced three baselines can be created by applying the phase data at each range point to the Three Antenna Interferometer Angle of Arrival equation to calculate the unambiguous AOA. The calculated unambiguous angle of arrival is used to determine elevation relative to the receive sensor baselines and is assumed to be limited to within the transmit fan beam at the particular azimuthal location. The phase data may be decimated by rejecting all phase data associated with amplitudes below a threshold limit representing the receive channels' noise floor. In this manner only valid targets will have their elevation calculated, further reducing the processing load on the digital circuits.

The first process is to measure the electrical phase difference between the two antennas of the baseline. This phase difference is known to be a function of the distance between the antennas and the angle of arrival as shown in the equation below.

Phase Delay Between Two Antennas:

$$\psi = \frac{2\pi f d}{c} \sin\theta$$

Therefore, the measured phase and antenna distance for each baseline can be used to calculate the angle of arrival by using the above equation and solving for the Angle of Arrival.

Solve for Angle of Arrival (AOA):

$$\theta = \arcsin\left(\frac{\psi c}{2\pi f d}\right)$$

However, due to 'Phase Wrapping' multiple angles are mathematically valid. The maximum and minimum valid unambiguous electrical phases for each baseline are given by the relationship below:

Maximum and Minimum Unambiguous Phase Delay:

$$\frac{-2\pi f d}{c} \leq \psi \leq \frac{2\pi f d}{c}$$

Where:
ψ=Antenna Phase Delay
f=Frequency
d=Baseline-Distance
θ=Angle Of Arrival

Using the processing steps above, the Amplitude, Phase, and Frequency is converted directly to RCS, Height, and Range which is the basis of 3D environmental awareness. See FIG. 10.

Radar Assembly of the Present Invention

Figures 10, 11:
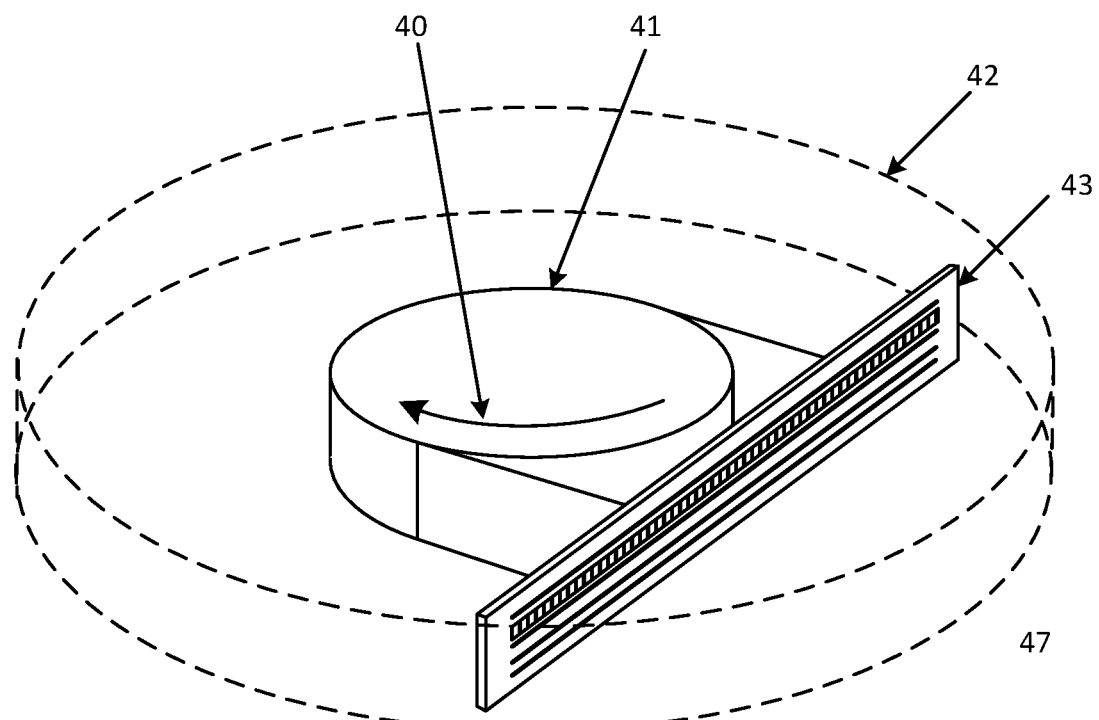
FIG. 10 is the RCS and Height vs Distance data file construction derived from the Amplitude and Relative Phase vs Frequency data file after processing.
FIG. 11 illustrates a radar assembly according to one embodiment of the present invention.

Referring to FIG. 11, a radar assembly 47 according to an embodiment of the present invention has one 360 degree rotating (see 40) assembly 41, and is housed in a protective radome 42 that includes several antennas that can be arranged as a fixed phased array transmit antenna 44 (see FIG. 13, and which can be the same as antenna 21 in FIG. 2) and three or more separate fixed receive antenna arrays 45 (see FIG. 13) that are all mounted together on a single substrate 43. The rotating assembly 41 is a rotating base which is the main structural foundation for the substrates 43 and 43a, and provides for their rotation while hidden within the fixed protective radome 42 which can also be used as a cosmetic body panel. The motor (not shown) used to drive the rotating assembly 41 is fixed to the vehicle and is hidden under the rotating assembly 41 to minimize the height of the overall assembly. The motor may drive the rotating assembly 41 via a synchronous motor or stepper motor so that its speed may be controlled by the system controller. A rotational position encoder (not shown) may be connected to the rotating assembly 41 to provide precise rotational positioning data.

Figure 30:
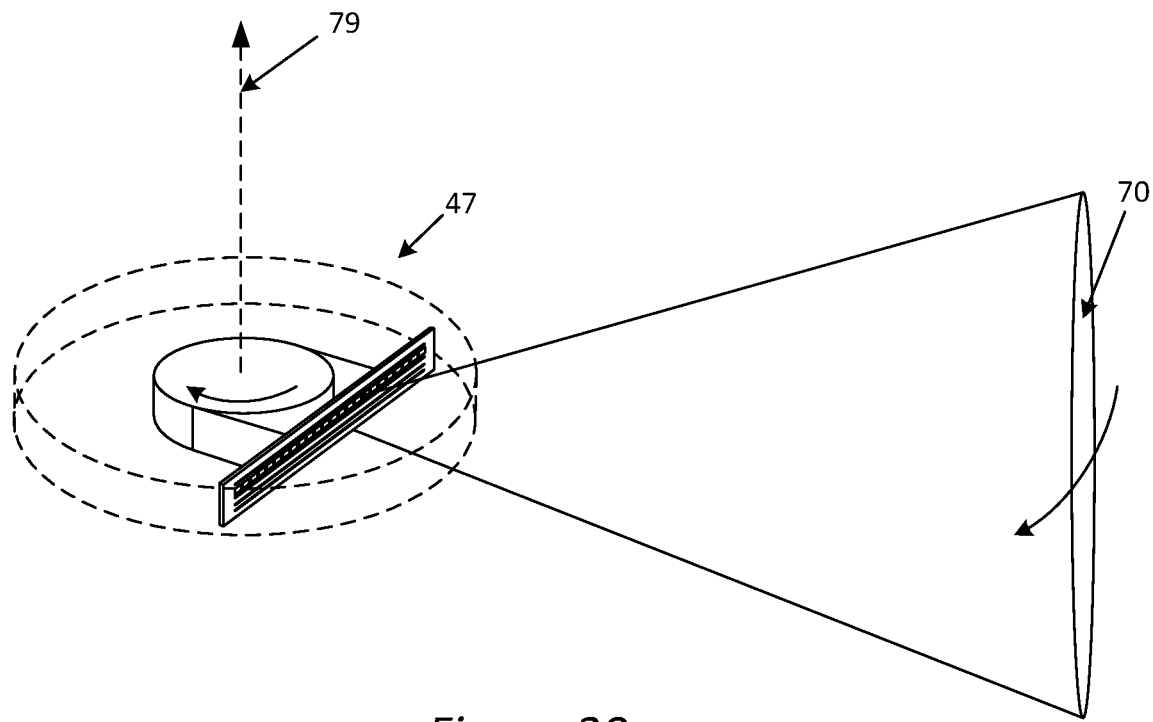
FIG. 30 illustrates the radar assembly of FIG. 11 with the associated fan beam shown in one orientation.

FIG. 30 shows the radar assembly 47 and its generated transmit and/or receive fan-beam pattern 70 used to narrow the radar's azimuthal field of view. The fan beam is defined by its narrow azimuthal beam width, which defines the radar's azimuthal resolution, and its wide elevation beam width, which defines the radar's total elevation field of view. Fan beams can be generated by different antenna types and configurations. However, the one feature that is common for all fan beam antennas is that a horizontally wide antenna relative to its operating wavelength will have a relatively narrow horizontal beam width, and a relatively short antenna height relative to the operating wavelength will have a large elevation beam width, and both azimuthal and elevation beam widths are independently adjustable with changes in antenna geometry. So for a one degree azimuthal beam width the antenna will require a width of approximately 50 to 70 wavelengths. For a 60 degree elevation beam width the physical height only needs to be 2 wavelengths or less.

Figure 13:
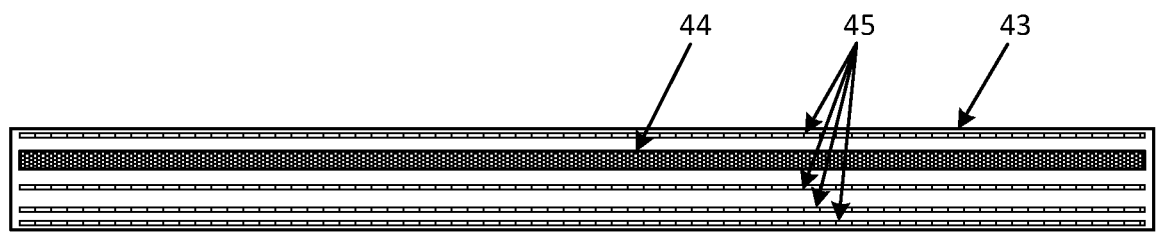
FIG. 13 illustrates the transmitter and receiver antenna substrate for the radar assembly of FIG. 11.
Figure 19:
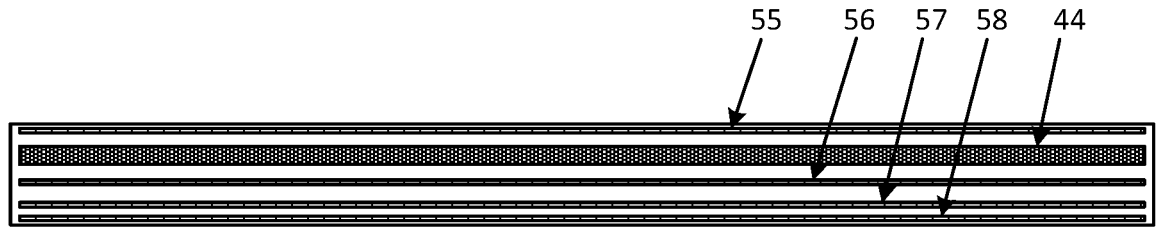
FIG. 19 illustrates a possible antenna layout on a substrate showing one transmit antenna and four receive antennas, that can be based on the substrate of FIG. 13.

FIG. 19 shows an example of the antenna substrate of FIG. 13 with its transmit antenna 44 and the four receive antennas 45 now labeled as 55, 56, 57, 58. The receive antennas 55, 56, 57, 58 are arranged as a collinear four-antenna interferometer using unequal spacing. In this case, 58 is the reference antenna and three baselines of varying lengths are created. The antenna-pair 58 and 57 form the shortest baseline, the antenna-pair 58 and 56 form the medium length baseline, and the antenna-pair 58 and 55 form the longest baseline. Simple analysis of the AOA equations will identify ideal separation ratios that will minimize the possibility of any remaining ambiguity. The transmit antenna 44 is placed within the widest available space between the receive antennas 55, 56, 57, 58 in order to minimize the overall height of the substrate. However, careful analysis and design is required to minimize unwanted direct coupling from the transmit antenna 44 to the receive antennas 55, 56, 57, 58.

Figure 12:
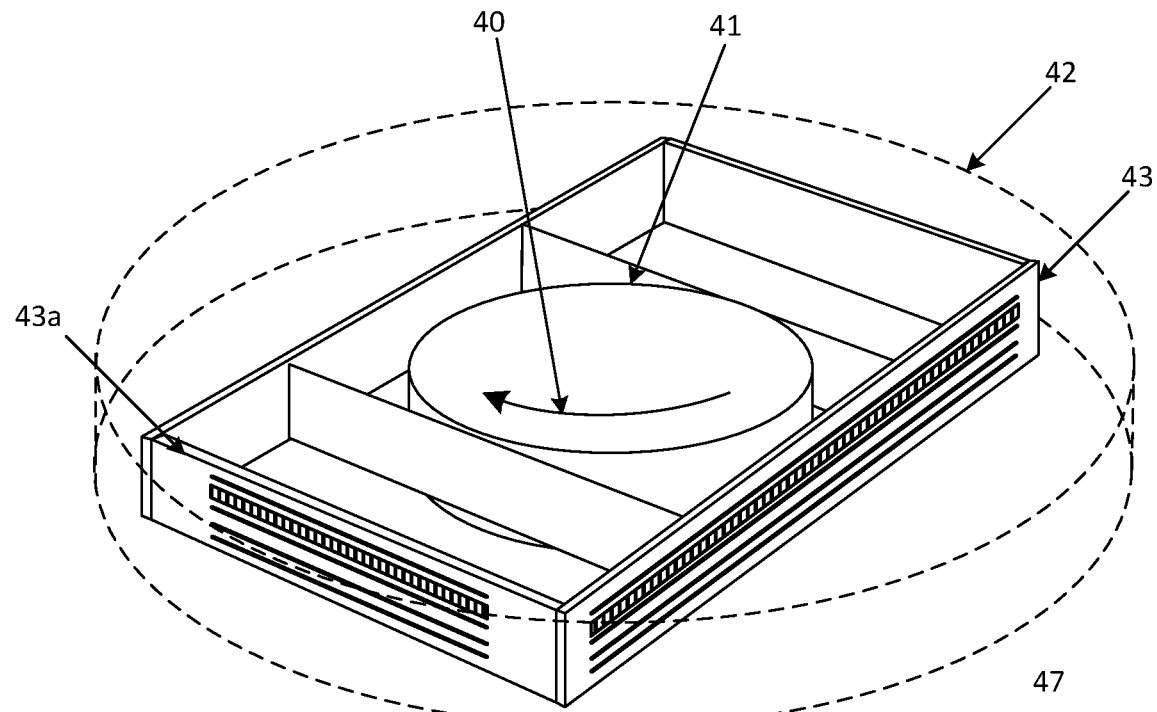
FIG. 12 illustrates a modification to the radar assembly of FIG. 11.

In an enhanced embodiment as shown in FIG. 12, more than one substrate 43a can be added to the rotational assembly to provide additional scanning capability to add short range scanning, alternate polarizations or increased scan rate, for example.

Figure 14:
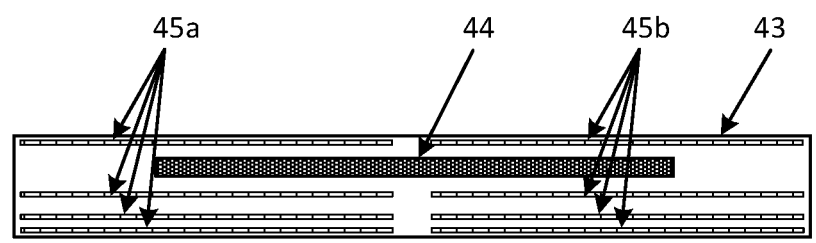
FIG. 14 illustrates the transmitter and receiver antenna substrate for the radar assembly with dual four antenna interferometers to improve azimuthal precision.

Another enhanced embodiment is shown in FIG. 14, where two identical four-antenna interferometers are positioned side by side (45a and 45b), although minimally, only one additional antenna is required. This duplication allows each of the interferometer antennas to have one horizontal baseline so that an azimuthal AOA calculation can be made to improve the target azimuth accuracy to be better than the azimuthal beam width. By carefully selecting the horizontal separation of the two interferometers, and keeping the azimuthal beam width relatively narrow, any calculated ambiguous angles will fall outside of the known transmit antenna beam width and can be automatically rejected, leaving only the one true azimuthal AOA. This enhancement is useful for wider transmit beam widths that are required for accurate target mapping very close to the radar. Using the embodiment shown in FIG. 12, this alternate antenna configuration can be added so that one transceiver is optimized for long distance scanning and another is optimized for short distance scanning.

Figure 15:
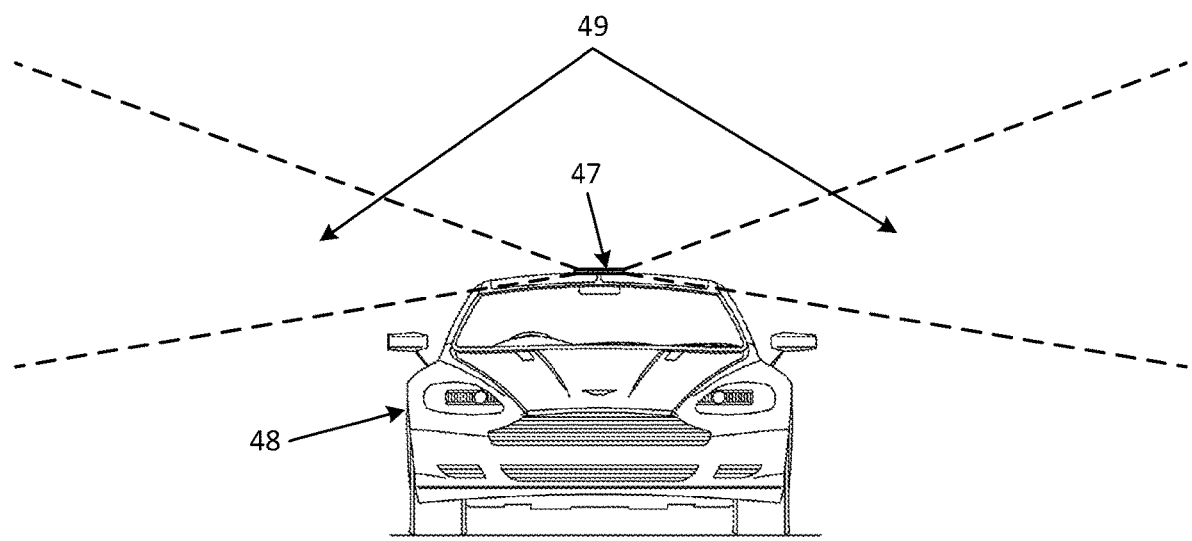
FIG. 15 is a front view of an automobile and a preferred placement of the radar with its field of view.
Figure 16:
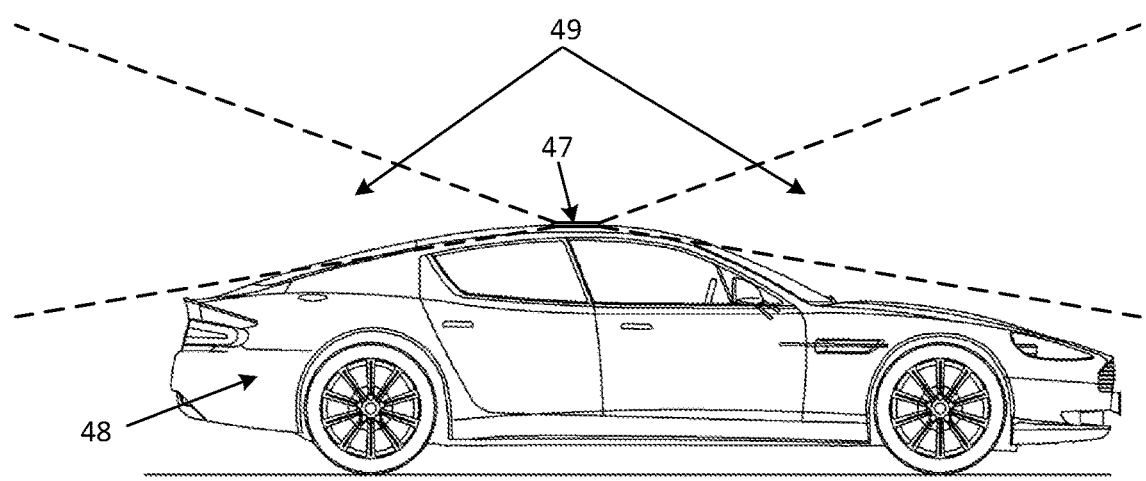
FIG. 16 is a side view of an automobile and a preferred placement of the radar with its field of view.
Figure 17:
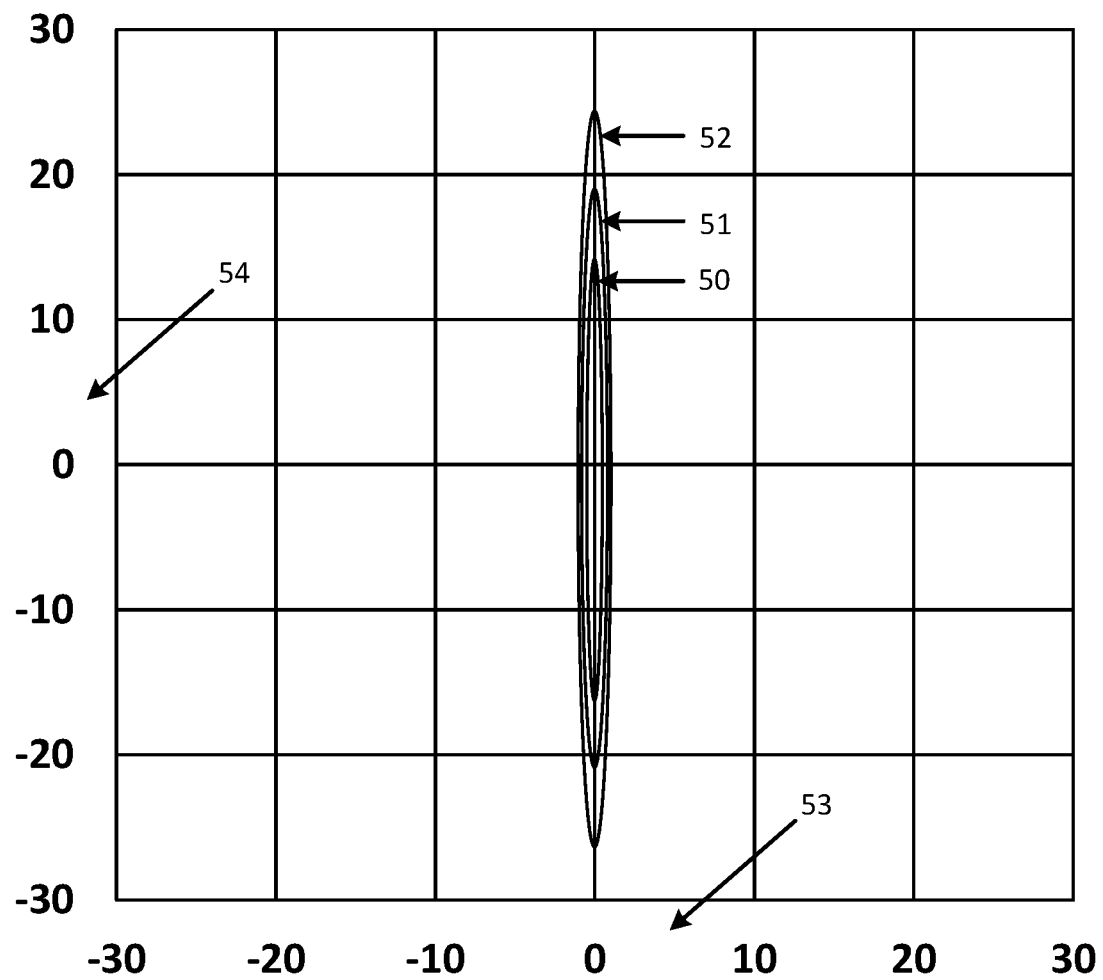
FIG. 17 is an azimuth vs elevation contour plot of a transmit and/or receive antenna's 'Fan Beam' pattern.
Figure 18:
FIG. 18 is an example of a multi-element array antenna design that can be used to create a transmit or receive 'Fan Beam' pattern.

Referring to FIGS. 15 and 16, the radar assembly 47 can be attached to a vehicle, mobile platform, or fixed platform 48 for optimal scanning. The rotating assembly is oriented such that the axis of rotation is predominantly orthogonal to the earth's surface to ensure complete rotational beam coverage (see 49) around the vehicle or platform. The transmit antenna 44 is isolated from the receive antennas 45 and is configured to radiate a single main beam having a narrow dimension horizontally and a wider dimension vertically, and is pointed to radiate predominantly in a horizontal direction. FIG. 17 shows an antenna boresight Elevation 54 vs Azimuth 53 contour plot for a one degree beam width with a 3 dB (see 50) 30 degree, 6 dB (see 51) 40 degree, and 9 dB (see 52) 50 degree contour lines. FIG. 18 shows a fixed array of a type to create a fan beam transmit or receive antenna.

The four receive antennas 55, 56, 57, 58 shown in FIG. 19 are collinearly aligned vertically and configured as a four-antenna interferometer, as described above. These receive antennas 55, 56, 57, 58 and the transmit antenna 44 are attached to the rotating assembly so that the peak receive antenna patterns always point in the same direction as the radiated fan beam peak pattern to receive reflections from objects in the local environment. The respective spacings between the four receive antennas shown are used to create three or more interferometric baselines consistent with the principles of a three antenna interferometer used for determining the unambiguous angle of arrival of a free space emission.

Figure 20:
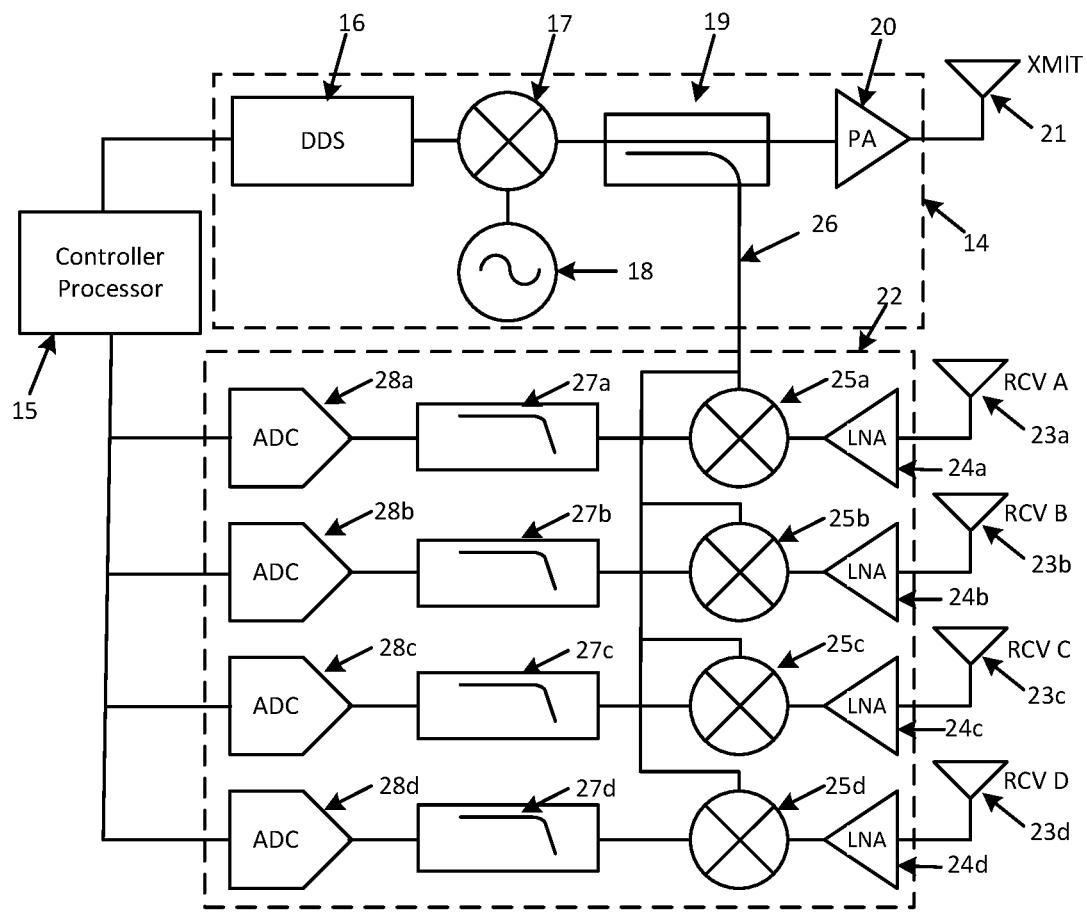
FIG. 20 illustrates an FMCW radar architecture that includes separate receive circuits for a four antenna interferometer.

The radar radio frequency circuits are arranged in a common FMCW configuration using a common FMCW frequency, in this example, 77 GHz. However, this embodiment costs four independent receive channels, as shown in FIG. 20. While the antenna assembly (see 21, 23a, 23b, 23c, 23d in FIG. 20) is in rotation, a transmitter circuit 14 generates a frequency modulated RF waveform and then up-converts this signal through the mixer 17 to the 77 GHz band. The power amplifier 20 amplifies it and passes this waveform to the transmit antenna 21 which radiates the electromagnetic energy with a linear or circular polarization to illuminate objects in the local environment. This transmit antenna 21 creates a fan beam pattern illuminating objects in its path with an FMCW modulated signal and causes reflections from objects within the beam's path to return to the receive antennas (23a, 23b, 23c, 23d). A receive module consisting of three or more separate receive antennas (23a, 23b, 23c, 23d), radio frequency processing channels, and digital processing channels, each collects reflected energy from the environment with its own unique amplitude and phase data. For the present invention, any type of FMCW modulation type can be used.

These four receive antennas (23a, 23b, 23c, 23d, which correspond to the receive antennas 55, 56, 57 and 58, respectively) pass the received signals to the receiver (22) where each channel down-converts through a mixer (25a, 25b, 25c, 25d) with a sample of the transmit waveform 26 and digitizes the data (28a, 28b, 28c, 28d) and then passes it to the system controller processor 15 for digital processing and storage.

The stored digital data for each of the three or more receive channels consists of complex time domain signals that may consist of several hundred to many thousands of data pairs representing the received signal's amplitude vs time, as shown in FIGS. 3 and 4. A microprocessor or digital signal processor converts the digital data into a spectral plot using one of the many forms of the Fourier Transform which is configured to produce an amplitude, phase vs frequency triplet dataset (see FIG. 7), in order to derive amplitude vs frequency (see FIG. 5) and the other representing relative phase vs frequency (see FIG. 6). These processed data sets are stored for further processing.

Every receive channel will have its own unique complex series calculated and stored. In the event of in-phase and quadrature downconversion (i.e., "synchronous detection"), each receive channel will have two unique series calculated. Additionally, each receive channel may have two polarization options, e.g. Horizontal and Vertical, or Left and Right Handed, Circular Polarization. Each of these will require a unique data series downconverted, stored and processed.

Each of the three or more receive channel's amplitude vs frequency data sets are converted to amplitude vs range as the FMCW modulation provides a direct conversion between frequency and range. Then the Amplitude vs Range data is then converted to RCS vs Range data using the RCS equation. See FIG. 21. The final processing step uses the phase data from each of the sensors to calculate the Angle of Arrival (AOA) of the two or three active baselines. Correlating the baselines provides an unambiguous Elevation Angle vs Range dataset which is then easily converted to Height vs Range (see FIGS. 10 and 23) using simple trigonometry.

Figure 24:
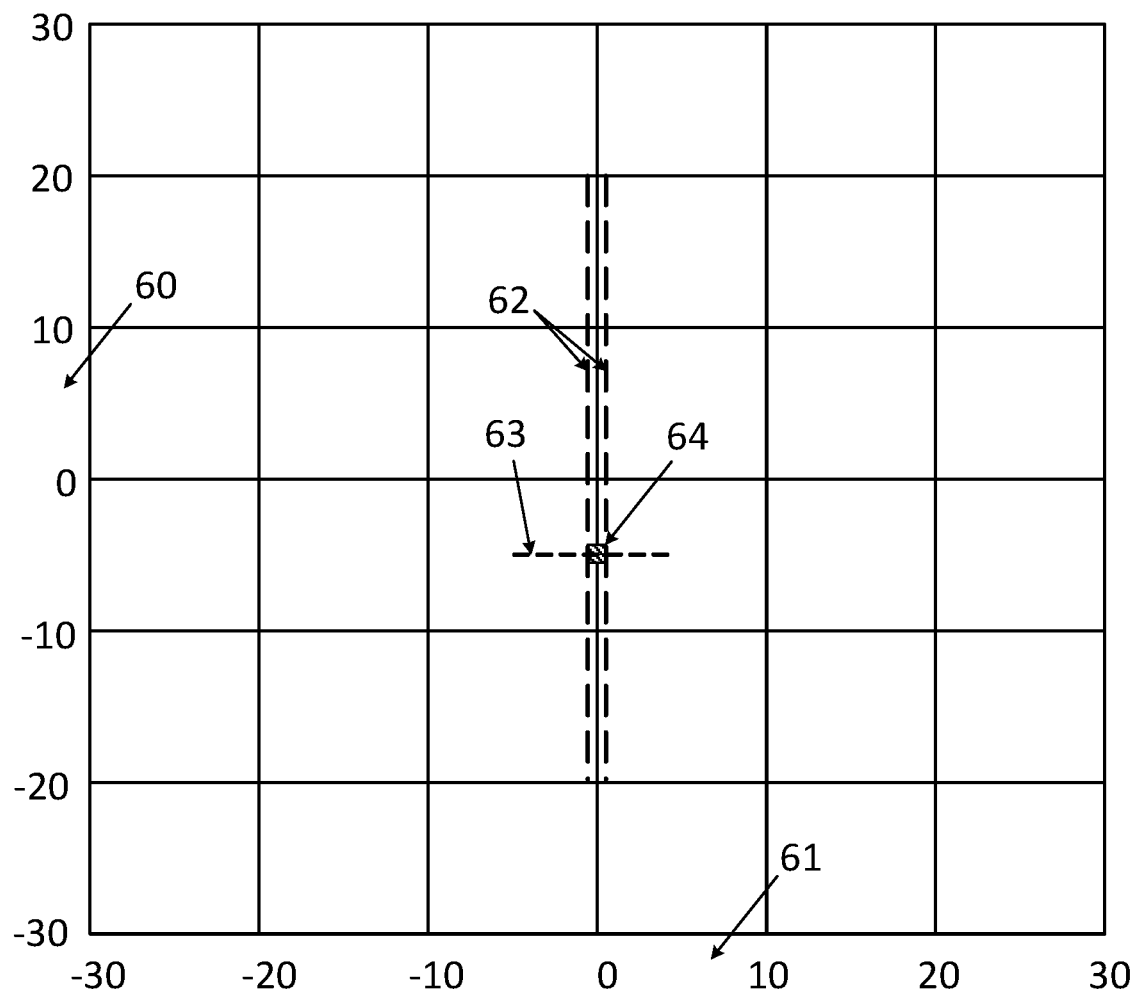
FIG. 24 is an azimuth vs elevation plot illustrating how a calculated elevation angle locates a target within the fan beam's azimuth limits.

FIG. 24 shows how this elevation angle defines one of the three dimensions. The azimuth position defines the limits of the azimuthal resolution (see 62), in this case one degree, and the elevation angle (see 63) defines the central position of the target cell 64 in azimuth 61 and elevation 60. This complete data triplet then consists of RCS, Height and Range. See FIG. 23.

Figure 25:
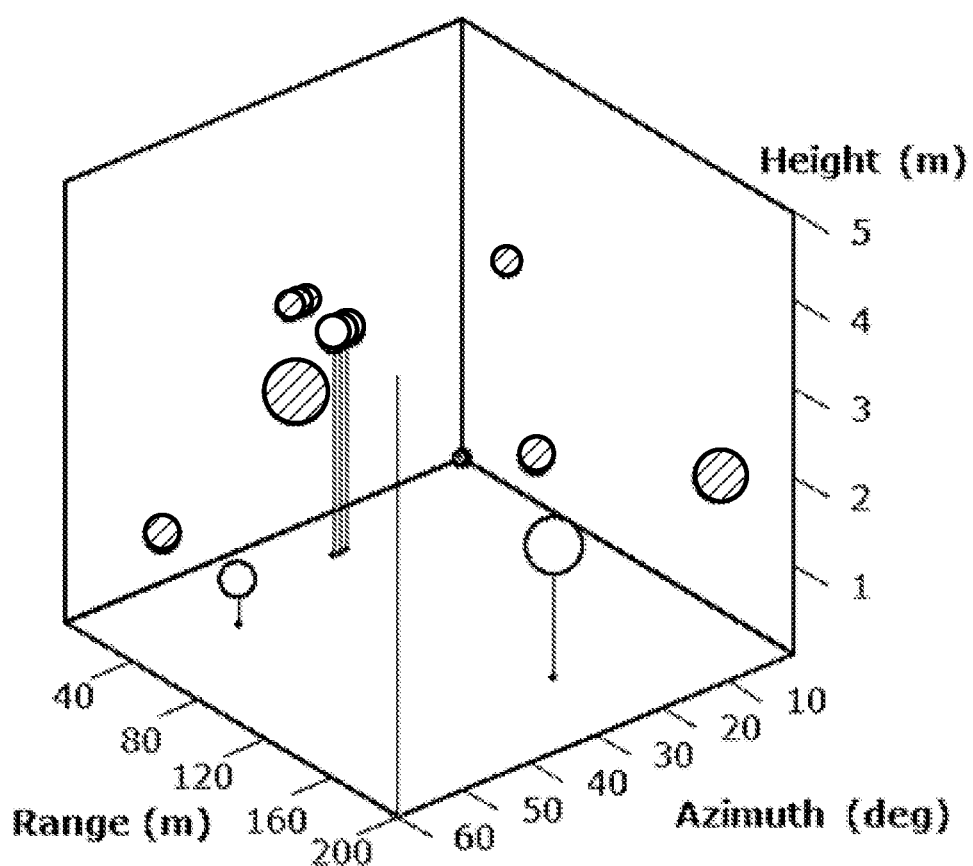
FIG. 25 illustrates the combined target environment of azimuth, elevation, range, and RCS.

Range and Height only provide two of the three required dimensions. With azimuth information from the mechanical positioning system and its one degree transmit beam width, the final dimension of the three is defined. The azimuth position is moved to the next position for another full FMCW sweep and processing interval. When all azimuth positions have been scanned and processed, the data is compiled as a complete environment of Azimuth, Range, and Height dataset. See FIG. 25. The output of the radar will be sent to the automobile's central system controller to be compared and combined with all other vehicle sensor data sets.

The antenna geometry changes can also redirect the scan and change the scan type depending on the fan beam's elevation angle relative to the axis of rotation 79 of the rotating assembly 41. One possible configuration is shown in FIG. 30, with the fan beam pattern 70 fixedly set orthogonally with respect to the axis of rotation 79. This particular scan can perform a 360-degree azimuthal scan with a narrow or wide elevation field of view depending on the width of the fan beam in elevation. The beam is aimed at horizontally so that one half of the beam is scanning for targets above the horizon and one-half scanning below the horizon.

Figure 31:
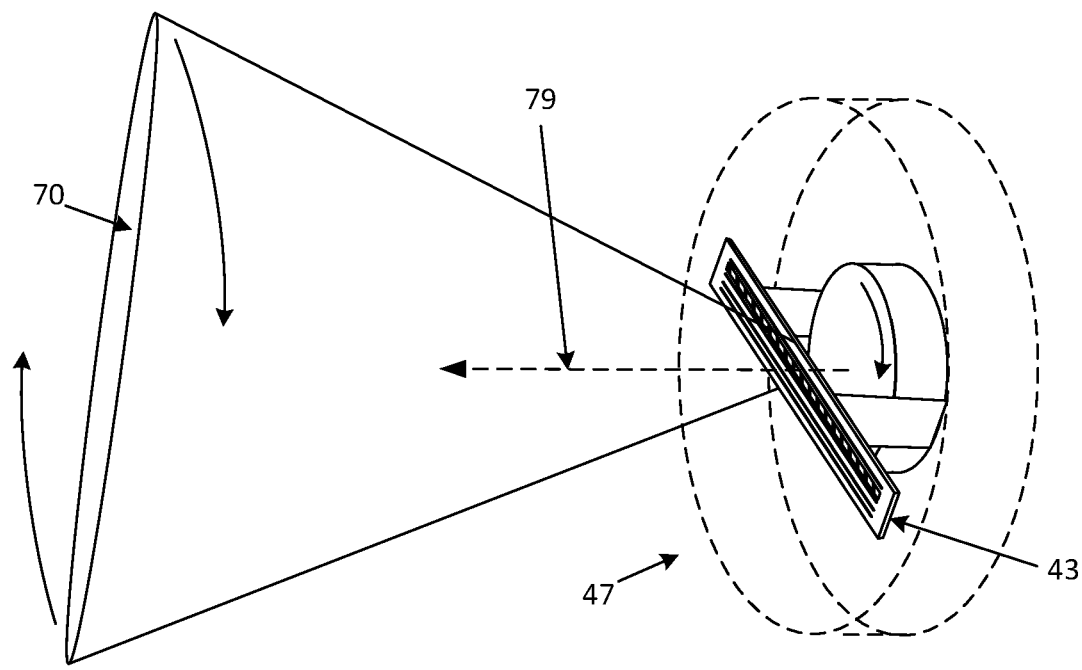
FIG. 31 illustrates the radar assembly of FIG. 11 with the associated fan beam shown in another orientation.

At the other extreme, FIG. 31 shows the fan beam pattern 70 fixedly centered on the axis of rotation 79. This creates a concentrated conical scan pattern in a more limited field of view. FIG. 31 also shows the radar platform of the rotating assembly 41 tilted by 90 degrees in order to aim the conical field of view towards the direction of interest, such as in the front of a moving vehicle with the beam aimed in the direction of travel. This particular configuration will allow targets in the beam center to be interrogated with RF from all polarizations, which is advantageous as many targets are polarization sensitive.

Figure 32:
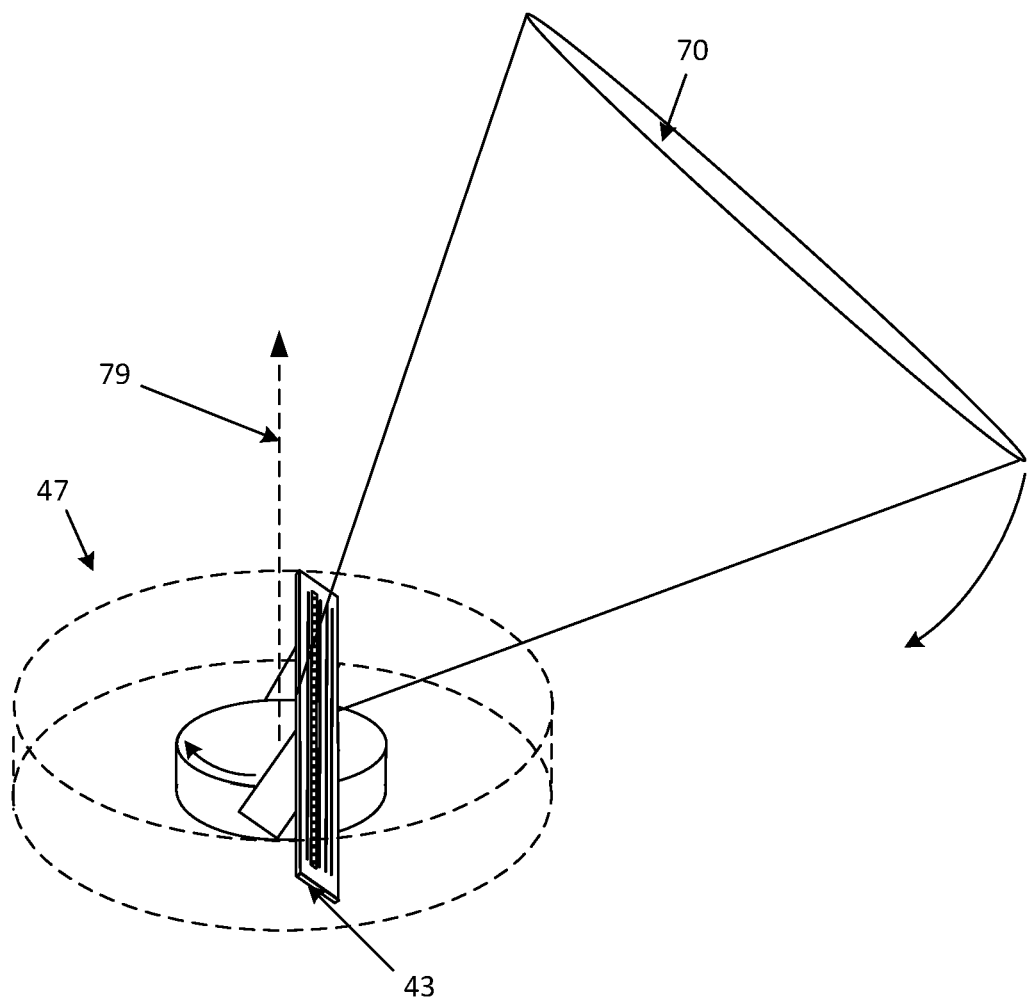
FIG. 32 illustrates the radar assembly of FIG. 11 with the associated fan beam shown in yet a further orientation.

FIG. 32 shows an example of a beam that is at an angle between zero and 90-degrees elevation relative to the axis of rotation 79. This configuration can be used to create a full hemispherical scan by extending the width of the fan beam such that the lower side scans down to zero degrees elevation and the other side extends to 90 degrees. If the beam is centered, the beam angle will be at 45 degrees, but many other angles between zero and 90 degrees can be chosen depending on the application.

Sample Process

Figure 26:
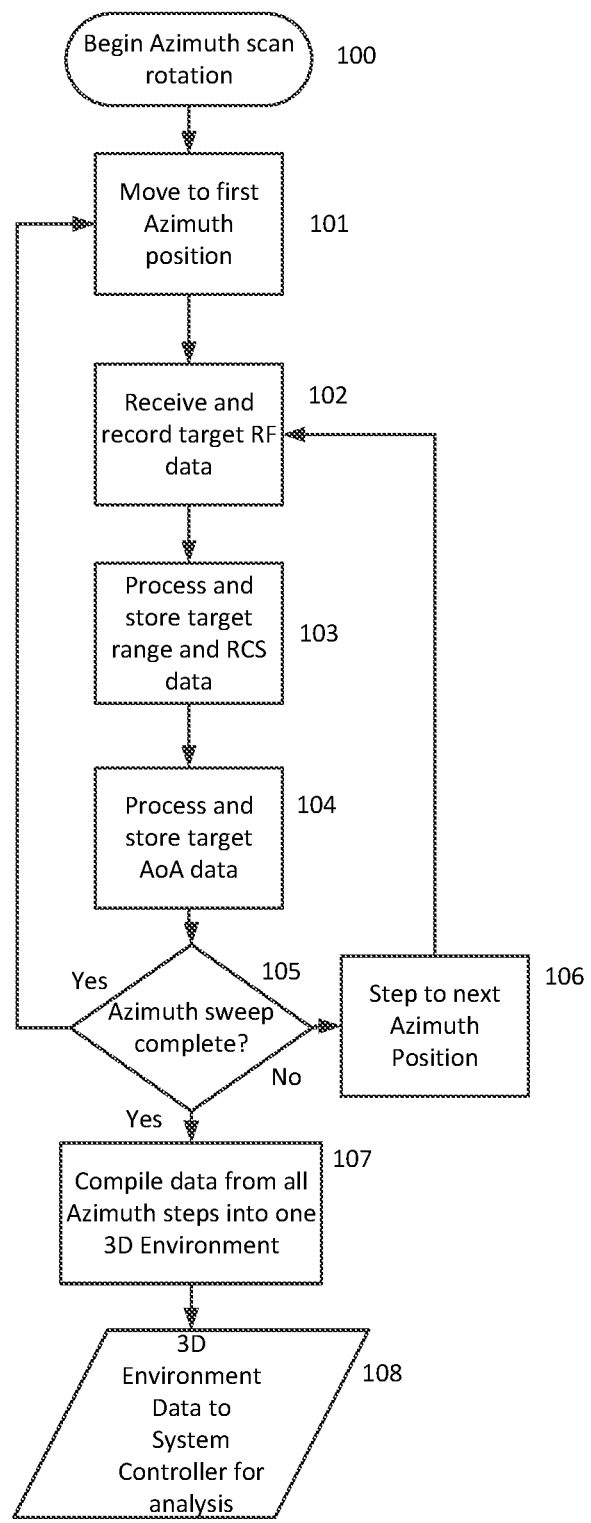
FIG. 26 is a flow chart illustrating the overall process flow for the radar system of the present invention.

FIG. 26 is a flowchart illustrating the associated top level process flow for the radar system of the present invention. For this example, it is assumed that a complete 360 degree azimuth sweep consists of 360 separate processing intervals; one for each one degree position. Each processing interval will consist of one full frequency sweep to determine target range, elevation and relative size at that single azimuth position. One full revolution of the rotor will then consist of 360 data sets that, when combined, will create a full three-dimensional environment. It is also assumed that the rotor spins at 600 RPM or 10 revolutions per second and therefore will generate 10 complete environmental updates per second.

The top level of the process begins with the rotor and antenna assembly starting its rotation in step 100 and reaching a steady rotational speed, in this case, 600 RPM. Once the speed is stabilized sufficiently for taking measurements, the assembly will rotate to its first azimuth position in step 101 to begin radiating and acquiring data. The system transmits its FMCW waveform and then receives reflections from targets in the beam in step 102. Next, in steps 103 and 104, this data is processed, digitized, and stored for further processing. In step 105, if the full 360 degree azimuth sweep is not complete, the rotor will step to the next azimuth position in step 106 and then repeat the transmit and receive functions (step 102), and the process and store functions (steps 103 and 104). This cycle is repeated until the azimuth sweep is complete, where the full environmental data set is compiled in step 107 and then passed on to the vehicle's system controller for its consumption in step 108. At the same time, the rotor moves back to the first azimuth position (step 101) to begin the 360 degree data acquisition cycle again.

Figure 27:
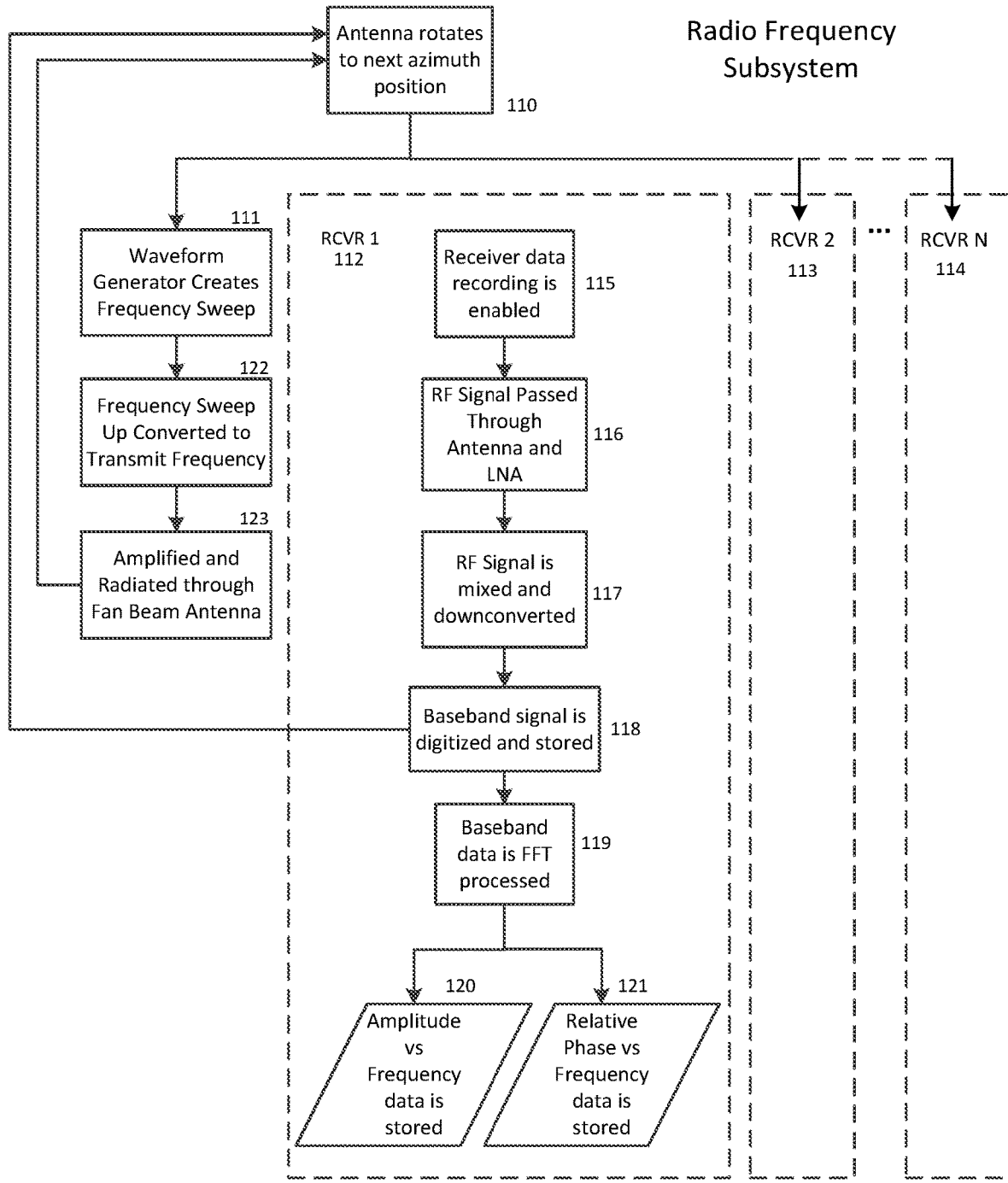
FIG. 27 is a flow chart illustrating the operation of the radio frequency subsystem for steps 101 and 102 of FIG. 26.

The flow chart in FIG. 27 is the detailed Radio Frequency process shown in steps in 101 and 102 of FIG. 26. The radar system is energized and initialized, applying power and synchronizing the control and processing circuits, receive and transmit sections, and the motor drive components. As the drive motor stabilizes the rotor to its operating rotational speed, the control circuits identify the instantaneous azimuthal location of the rotor in step 110, and its transmit subsystem (see step 111) and receive subsystems (see subsystems 112, 113, and 114, which are actually receivers 22) begin their FMCW sweep process. In this example, the receivers 22 are identical in processing and hardware configuration except for antenna location.

In step 111, the transmit circuit 14 is energized and begins its linear frequency sweep, and is then up converted to the transmit frequency (step 122), which is assumed here to be from 76 GHz to 77 GHz and is a triangular waveform. In step 123, the signal is then amplified and radiated via an antenna that has been designed to radiate a vertical 'Fan Beam'. The full sweep time is selected so that the rotor movement is within its one degree processing interval which is 278 microseconds in this case. At the beginning of the sweep, the receive circuits 22 are enabled and data begins recording in step 115.

The transmit RF energy is formed into a beam that is one degree in azimuth and 30 degrees in elevation and illuminates all objects in the beam and within the radar's effective range. Objects in the beam's path scatter the incident energy in many directions and a small portion of this energy is reflected directly back to the radar. The magnitude of this reflected energy is directly related to the target's Radar Cross Section.

The reflected signal is delayed in time due to the two-way travel delay of the energy at the speed of light. Since the transmit signal is sweeping in frequency, the received signals at the radar are at a previous frequency in the frequency sweep. Three or more collinear receive antennas 23 arranged vertically and spaced unevenly receive nearly identical reflected signals and each receiver will amplify its received signal (see step 116 and the description above in connection with FIG. 2) and mix it with a portion of the transmit signal (see step 117 and FIG. 2). The mixing process will create sum and difference frequencies (aka "beat frequencies") and the circuits are designed to select the difference frequencies and reject the others. This output is called the baseband signal and is digitized and stored for processing at step 118. At the completion of the baseband digitization, the system is ready to perform another sweep at the next azimuth location while the digital processing can begin.

The further the target is from the radar, the larger the round trip delay, and therefore the larger the frequency difference between the receive signal and the transmit signal. This difference frequency then relates directly to the target distance, and its amplitude relates directly to its Radar Cross Section (RCS) and therefore its relative size.

The difference signal from each channel has been downconverted from many tens of GHz to kHz and MHz frequencies and is then digitized on high fidelity digitizer modules as part of step 118. This signal forms the complete record of one full transmit frequency sweep at a single azimuth position and is saved as an amplitude vs time data set. The data at each of the other receive channels is downconverted and recorded in the same way. It should be noted that even with the same number of receive antennas, more data may be created and stored if the system is processing quadrature and/or polarization data as well. These are options that may enhance the system performance but are not required to generate 3D radar images.

Once the difference signals of all the receive channels have been stored, the radar will step to the next azimuth position and begin repeating the FMCW data acquisition process at step 110. Meanwhile the data begins its digital signal processing.

Each channel will have its data processed through a Fast Fourier Transform (FFT) algorithm at step 119, and data is stored in step 120 or step 121. In one embodiment, the output of each channel's FFT will be two data series of Amplitude vs Frequency data pairs (see step 120) and Relative Phase vs Frequency data pairs (see step 121). Alternatively, a single triplet data set of Amplitude, Phase and Frequency may be generated and stored with equal performance.

Figure 28:
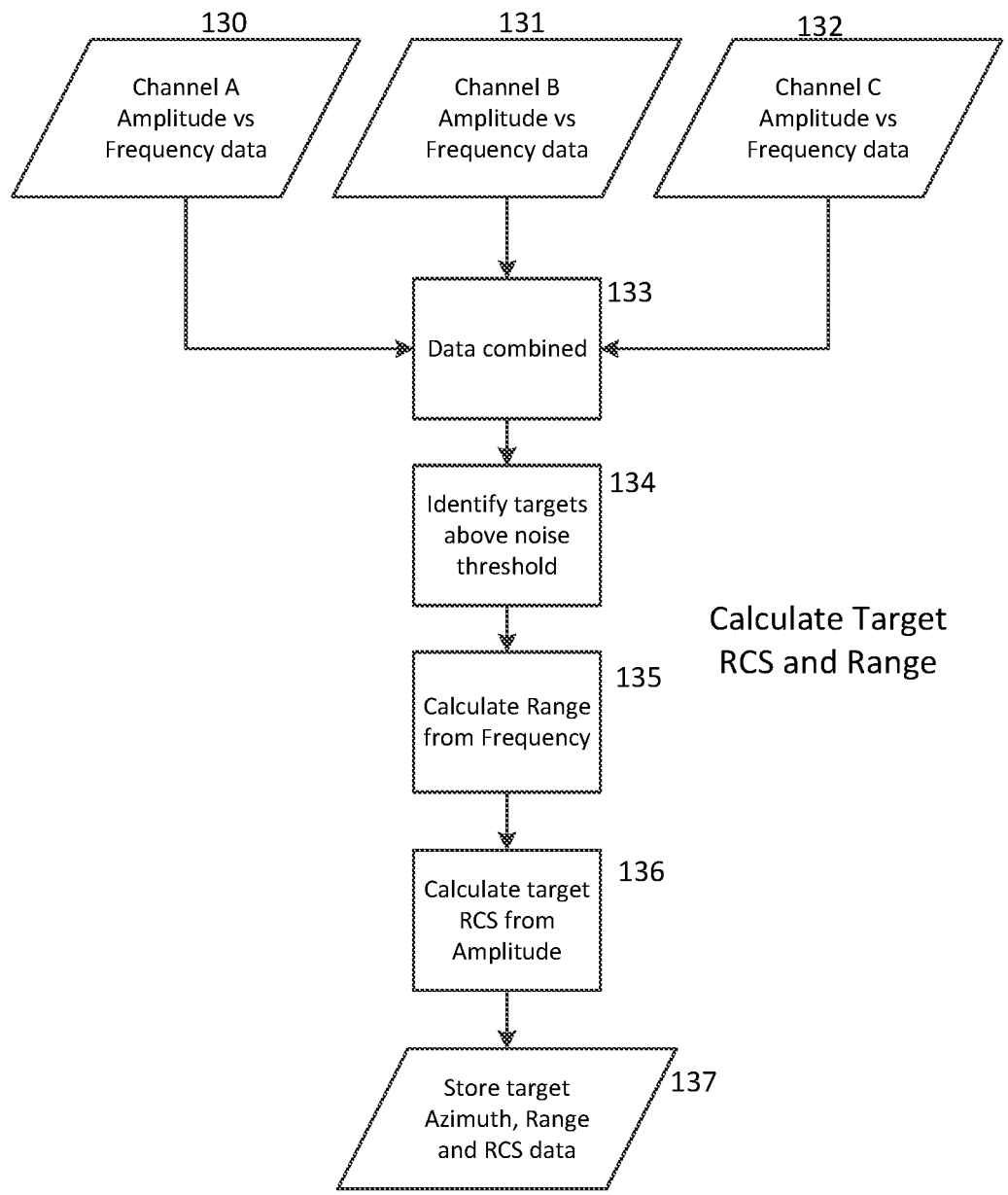
FIG. 28 illustrates the process for step 103 in FIG. 26.

FIG. 28 illustrates the process for step 103 as shown in FIG. 26. Initially, all of the receiver's amplitude vs frequency data sets (see 130, 131, and 132) are combined in step 133 by summing each receiver's amplitude channel together in order to increase the overall signal to noise ratio. Next, in step 134, the combined data set can then be decimated by rejecting all amplitude values below a previously determined threshold level representing the known noise floor levels of the system. This new data set is then further processed in step 135 by converting the Frequency data to Range data using the FMCW Range equation. In step 136, the amplitude data is then converted to RCS data using the RCS Radar Equation and the Range data. This will leave only the RCS and Range values of interest, and in step 137, this azimuth's position RCS vs Range data set is stored for future processing.

Figure 29:
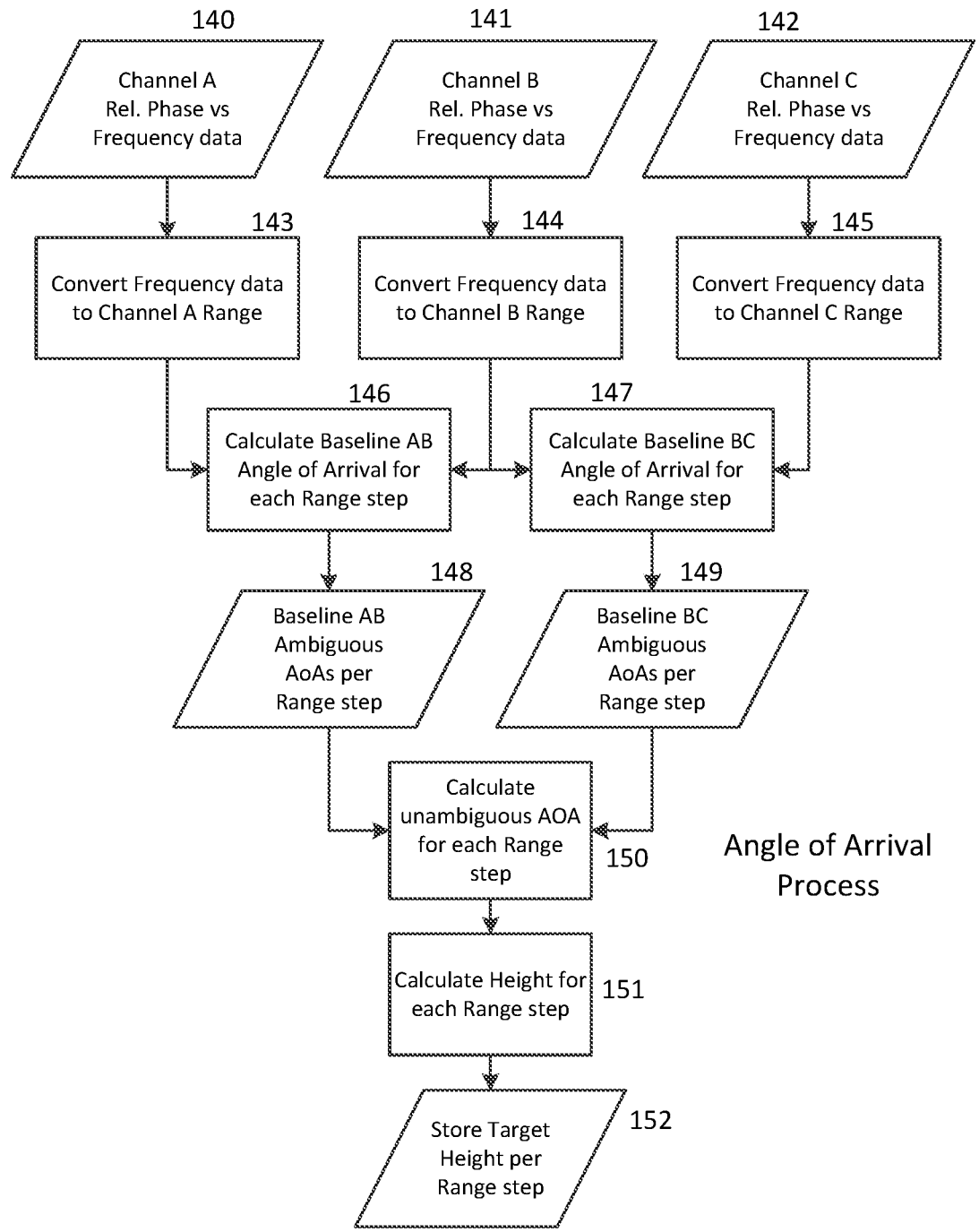
FIG. 29 illustrates the process for step 104 in FIG. 26.

FIG. 29 represents the process for step 104 as shown in FIG. 26. The Relative Phase vs Frequency data for each channel (see 140, 141, and 142) may also be decimated by converting Frequency to Range (see corresponding steps 143, 144, and 145) and rejecting the equivalent range data points as the RCS vs Range data set before as shown in FIG. 28. This ensures only valid target phase data will be used for calculating any Angle Of Arrival (AOA) data.

Valid target phase values from three (or more) sensors are used to calculate the AOA from two (or more) baselines in steps 146 and 147. For a three antenna system, these may be AB and BC, or AB and AC. In this example, we will use the two baselines AB and BC. Using the phase data from each antenna A, B, and C, the system calculates the two baseline's Angle of Arrival using the AOA formula. Both baseline calculations will generate a number of ambiguous arrival angles (see 148 and 149). Assuming the distance ratios are selected properly using common dual baseline interferometer principles, only one angle from each baseline will be the same. Step 150 determines this unambiguous Angle of Arrival for the radar at a particular Range step as the frequency data has already been converted to Range. This calculation is repeated for all remaining Range steps with valid target data within the FMCW sweep and then the correlated RCS, Range, and AOA data is converted to RCS, Range, and Height (see step 151) and then stored for each azimuthal FMCW sweep (see step 152).

At this time, all Target Angle of Arrival and Range data are converted to Target Height at Range by using simple trigonometry. All such measurements are relative to the vehicle and therefore the system controller will likely further process any number of offsets for height, pitch, yaw, etc., as these will require inputs from other sensors.

As each one degree azimuthal FMCW scan is completed and processed that data is stored in sequence until the full 360 single degree scans are complete (see step 107 in FIG. 26). The radar controller will then send the completed environmental data package to the vehicle's system controller for its consumption (see step 108).

Example Specifications

Ten complete 360 degree environments will be generated every second. A single 360 degree series of scans will take 100 milliseconds. Each single azimuthal degree FMCW scan will take place in approximately 278 microseconds. Each single degree scan will sense up to 102 k individual locations assuming 1 degree azimuth and 30 cm range resolution and 60 degrees of calculated elevation. Therefore, the total sensed local environment space consists of over 36 million individual voxels, (1 degree Azimuth×1 degree Elevation×30 cm Range=1 voxel) assuming a maximum distance of 256 meters.

The peak raw data rates, assuming three sensors with each one generating a single 2048 point 14-bit file per FMCW scan, is 309.7 Mb/s for a 360 degree scan. Each FMCW scan will require three 2048 14-bit FFTs or 10,800 FFTs per second. Assuming the output data is configured as Elevation=10 bits, Azimuth=14 bits, Range=12 bits, and RCS=14 bits, the maximum amount of data to represent one 360 degree environment is 254 Mb or 31.8 MB. However, assuming an environment's location points are typically decimated by 90%, a single environment will be represented by 3.18 MB, and the typical environment will require a data throughput of 31.8 MB/s for ten environments per second. All of these specifications can be accomplished using inexpensive commercial hardware available today.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method for using a radar assembly to sense an environment, comprising the steps of:
   a. providing a radar system comprising an antenna assembly secured for 360-degree rotation about an axis of rotation, the antenna assembly having mounted thereon at least one transmit antenna, and a first set of three or more separate fixed receive antennas, wherein the antenna assembly has a greater width than height, and creating a fanbeam that has a greater height than width, with the fanbeam fixedly set at an angle that ranges from being orthogonal with respect to the axis of rotation to being centered on the axis of rotation;
   b. rotating the antenna assembly to a first azimuth position;
   c. transmitting an FMCW waveform within the fanbeam and then receiving reflections from targets in the environment while in the first azimuth position;
   d. based on the received reflections, processing and storing data;
   e. repeating steps a-d for all other azimuths until an azimuth sweep has been completed;
   f. compiling a full environmental data set for the environment, wherein the data set comprises azimuth data, range data, elevation data and RCS data; and
   g. delivering the data set to a controller for analysis.

2. The method of claim 1, wherein the receive antennas are collinear and unevenly spaced vertically, and designed to have antenna gain patterns coaxially aligned predominately horizontally with a pattern of the fanbeam where a narrow beam width of the fanbeam pattern is oriented azimuthally and a wide beam width of the fanbeam pattern is oriented vertically, and with the first plurality of transmit antennas positioned in proximity of the receive antennas with a similar fanbeam orientation that is coaxially aligned with the receive antennas.

3. The method of claim 1, wherein step d includes processing and storing position RCS (radar cross section) and Range data sets for the specific azimuth.

4. The method of claim 3, wherein step d includes generating valid target phase data that will be used for calculating Angle Of Arrival (AOA) data.

5. The method of claim 4, wherein the valid target phase data is used to calculate the AOA from at least two baselines, and selecting the one angle from the at least two baselines that are found in all the baselines.

6. The method of claim 1, wherein the transmit antenna radiates electromagnetic energy with a linear and/or circular polarization to illuminate objects in the local environment.

7. The method of claim 1, wherein the received reflections undergo in-phase and quadrature downconversion.

8. The method of claim 1, wherein the received reflections are downconverted to baseband by homodyne mixing.

9. The method of claim 1, wherein the antenna assembly has mounted thereon a second transmit antenna positioned horizontally with respect to a first transmit antenna.

10. The method of claim 1, wherein the antenna assembly has mounted thereon a second set of one or more separate fixed receive antennas positioned horizontally with respect to the first set of three or more separate fixed receive antennas.

11. A method for using a radar assembly to sense an environment, comprising the steps of:
   a. providing a radar system comprising an antenna assembly secured for 360-degree rotation, the antenna assembly having mounted thereon at least one transmit antenna, and a first set of three or more separate fixed receive antennas, wherein the antenna assembly has a greater width than height, with the fanbeam fixedly set at an angle that ranges from being orthogonal with respect to the axis of rotation to being centered on the axis of rotation;
   b. creating a fanbeam that has a greater height than width;
   c. rotating the antenna assembly to a first azimuth position;
   d. transmitting an FMCW waveform within the fanbeam and then receiving reflections from targets in the environment while in the first azimuth position;
   e. based on the received reflections, processing and storing data, which includes:
      e1. processing and storing position Range data sets for the specific azimuth; and
      e2. generating valid target phase data that is used to calculate the Angle of Arrival (AOA) data from at least two baselines, and selecting the one angle from the at least two baselines that are found in all the baselines;
   f. repeating steps c-e for all other azimuths until an azimuth sweep has been completed;
   g. compiling a full environmental data set for the environment, wherein the data set comprises azimuth data, range data, elevation data and RCS data; and
   h. delivering the data set to a controller for analysis.

12. The method of claim 11, wherein step e1 includes processing and storing position RCS (radar cross section) and Range data sets for the specific azimuth.

13. The method of claim 11, wherein the transmit antenna radiates electromagnetic energy with a linear and/or circular polarization to illuminate objects in the local environment.

14. The method of claim 11, wherein the received reflections undergo in-phase and quadrature downconversion.

15. The method of claim 11, wherein the received reflections are downconverted to baseband by homodyne mixing.

16. The method of claim 11, wherein the antenna assembly has mounted thereon a second set of one or more separate fixed receive antennas positioned horizontally with respect to the first set of three or more separate fixed receive antennas.

* * * * *